(12) United States Patent
Cao et al.

(10) Patent No.: US 12,659,488 B2
(45) Date of Patent: Jun. 16, 2026

(54) ENCODING AND DECODING METHODS AND APPARATUSES, AND DEVICES THEREFOR

(71) Applicant: HANGZHOU HIKVISION DIGITAL TECHNOLOGY CO., LTD., Hangzhou (CN)

(72) Inventors: Xiaoqiang Cao, Hangzhou (CN); Yucheng Sun, Hangzhou (CN); Fangdong Chen, Hangzhou (CN); Li Wang, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 18/847,532

(22) PCT Filed: Mar. 17, 2023

(86) PCT No.: PCT/CN2023/082182
§ 371 (c)(1),
(2) Date: Sep. 16, 2024

(87) PCT Pub. No.: WO2023/174407
PCT Pub. Date: Sep. 21, 2023

(65) Prior Publication Data
US 2025/0227243 A1 Jul. 10, 2025

(30) Foreign Application Priority Data
Mar. 18, 2022 (CN) .......................... 202210273469.7

(51) Int. Cl.
*H04N 19/146* (2014.01)
*H04N 19/119* (2014.01)
(Continued)

(52) U.S. Cl.
CPC ......... *H04N 19/146* (2014.11); *H04N 19/119* (2014.11); *H04N 19/174* (2014.11); *H04N 19/88* (2014.11)

(58) Field of Classification Search
CPC .. H04N 19/146; H04N 19/119; H04N 19/174; H04N 19/88; H04N 19/436; H04N 19/42; H04N 19/426; H04N 19/184
See application file for complete search history.

(56) References Cited

U.S. PATENT DOCUMENTS 8,817,881 B1 8/2014 Yano et al.
8,831,107 B2 9/2014 Zheng et al.
(Continued)

FOREIGN PATENT DOCUMENTS

CN 101184244 A 5/2008
CN 101389021 A 3/2009
(Continued)

OTHER PUBLICATIONS

International Search Report in International Appln. No. PCT/CN2023/082182, mailed on Jun. 19, 2023, 5 pages.

*Primary Examiner* — Tat C Chio
(74) *Attorney, Agent, or Firm* — Fish & Richardson P.C.

(57) ABSTRACT

The present disclosure provides encoding and decoding methods and apparatuses, and devices therefor. According to an embodiment of the decoding method, a to-be-processed image can be divided into X*Y slices, and the number Z of chunks within each slice can be determined. Then, for each of the Y slice lines corresponding to the to-be-processed image, chunks corresponding to X slices in the horizontal direction of the slice line in a target code stream are deinterleaved, to obtain Z chunks for each of the X slices, where the Z chunks include at least two sizes of chunks; and the X slices are decoded based on bitstream buffers corresponding to the X slices in the horizontal direction of the
(Continued)

slice line. Where for each of the X slices, a bitstream buffer corresponding to the slice includes the chunks corresponding to the slice.

16 Claims, 6 Drawing Sheets

(51) Int. Cl.
H04N 19/174 (2014.01)
H04N 19/88 (2014.01)

(56) References Cited

U.S. PATENT DOCUMENTS

| | | | |
|---|---|---|---|
| 9,769,482 | B2 | 9/2017 | Zheng et al. |
| 10,432,938 | B2 | 10/2019 | Zheng et al. |
| 10,939,112 | B2 | 3/2021 | Zheng et al. |
| 11,659,184 | B2 | 5/2023 | Zheng et al. |
| 2010/0189181 | A1 | 7/2010 | Zheng et al. |
| 2014/0253806 | A1 | 9/2014 | Yano et al. |
| 2014/0341278 | A1 | 11/2014 | Zheng et al. |
| 2015/0187045 | A1* | 7/2015 | Chou .................... H04N 19/436 |
| | | | 345/547 |
| 2017/0064310 | A1* | 3/2017 | Huang ................... H04N 19/15 |
| 2017/0142414 | A1 | 5/2017 | Zheng et al. |
| 2019/0281320 | A1 | 9/2019 | Wu et al. |
| 2020/0014927 | A1 | 1/2020 | Zheng et al. |
| 2021/0160504 | A1 | 5/2021 | Zheng et al. |
| 2023/0319292 | A1* | 10/2023 | Li ......................... H04N 19/147 |
| | | | 375/240.02 |

FOREIGN PATENT DOCUMENTS

| | | |
|---|---|---|
| CN | 104038776 A | 9/2014 |
| CN | 104038776 B | 9/2017 |
| CN | 109429069 A | 3/2019 |
| CN | 113994664 A | 1/2022 |
| WO | WO 2021051156 A1 | 3/2021 |
| WO | WO 2021107624 A1 | 6/2021 |

* cited by examiner

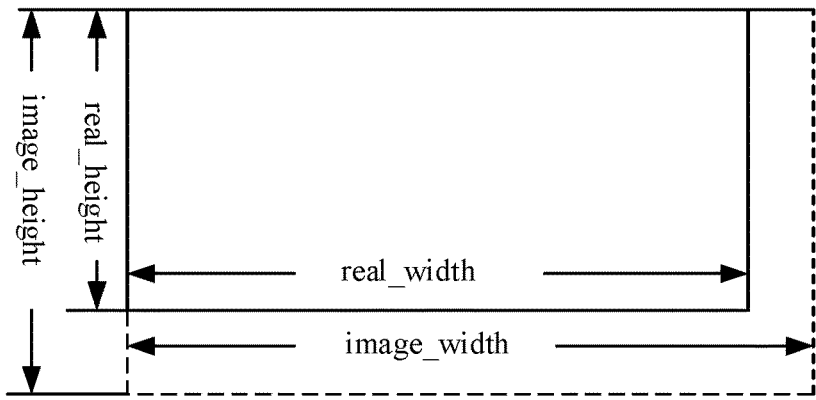
FIG. 1A
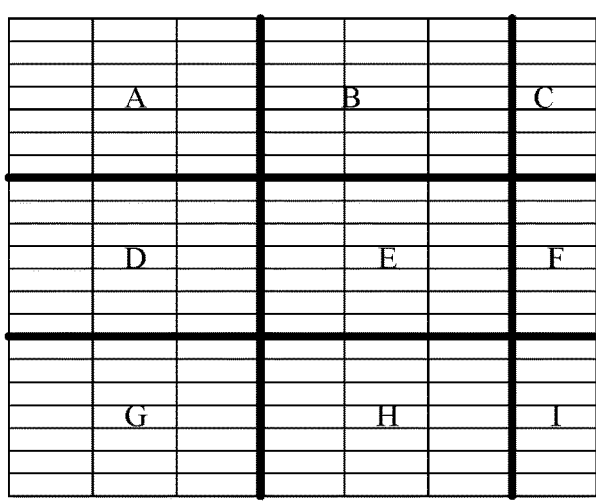
FIG. 1B
| Slice 1 | Slice 2 |
|---------|---------|
| Slice 3 | Slice 4 |
FIG. 1C-1
| Slice 1 | Slice 2 |
|---------|---------|
FIG. 1C-2
| Slice 1 | Slice 2 | Slice 3 | Slice 4 |
|---------|---------|---------|---------|
| Slice 5 | Slice 6 | Slice 7 | Slice 8 |
FIG. 1C-3
| slice_width | slice_width | ... | slice_width |
|-------------|-------------|-----|-------------|
| Slice 1 | Slice 2 | ... | Slice N |
| Slice N+1 | Slice N+2 | ... | Slice 2N |
| ... | ... | ... | ... |
FIG. 1D

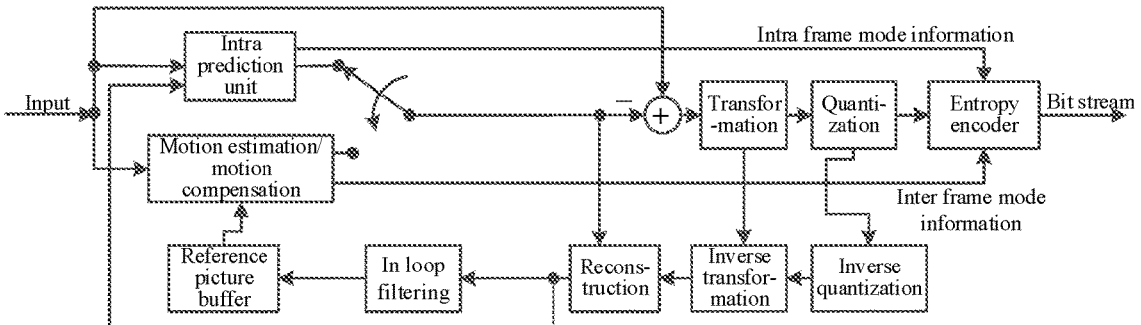

FIG. 1E

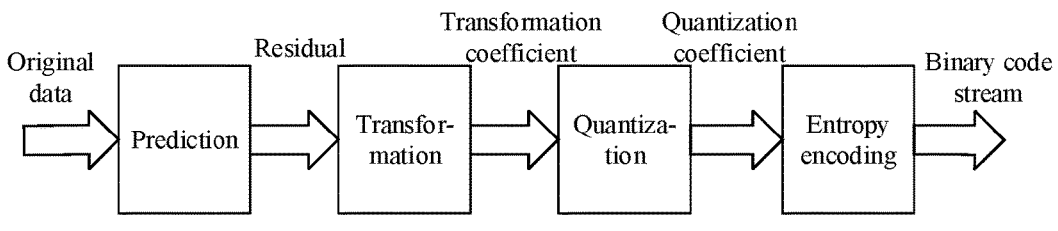

FIG. 1F

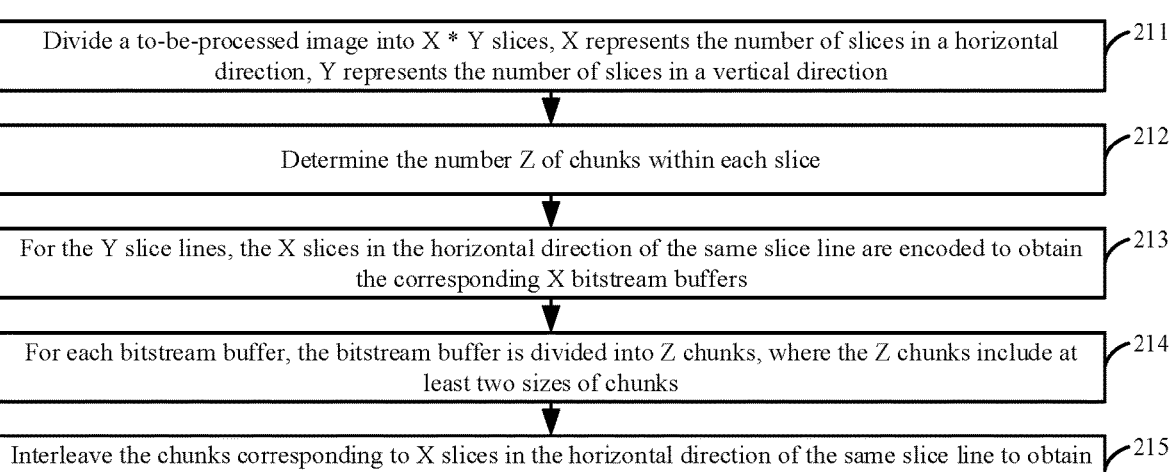

Divide a to-be-processed image into X * Y slices, X represents the number of slices in a horizontal direction, Y represents the number of slices in a vertical direction — 211

Determine the number Z of chunks within each slice — 212

For the Y slice lines, the X slices in the horizontal direction of the same slice line are encoded to obtain the corresponding X bitstream buffers — 213

For each bitstream buffer, the bitstream buffer is divided into Z chunks, where the Z chunks include at least two sizes of chunks — 214

Interleave the chunks corresponding to X slices in the horizontal direction of the same slice line to obtain the target code stream — 215

Transmit the target code stream to the decoding end, where the target code stream includes chunks of X slices in the horizontal direction — 216

FIG. 2A

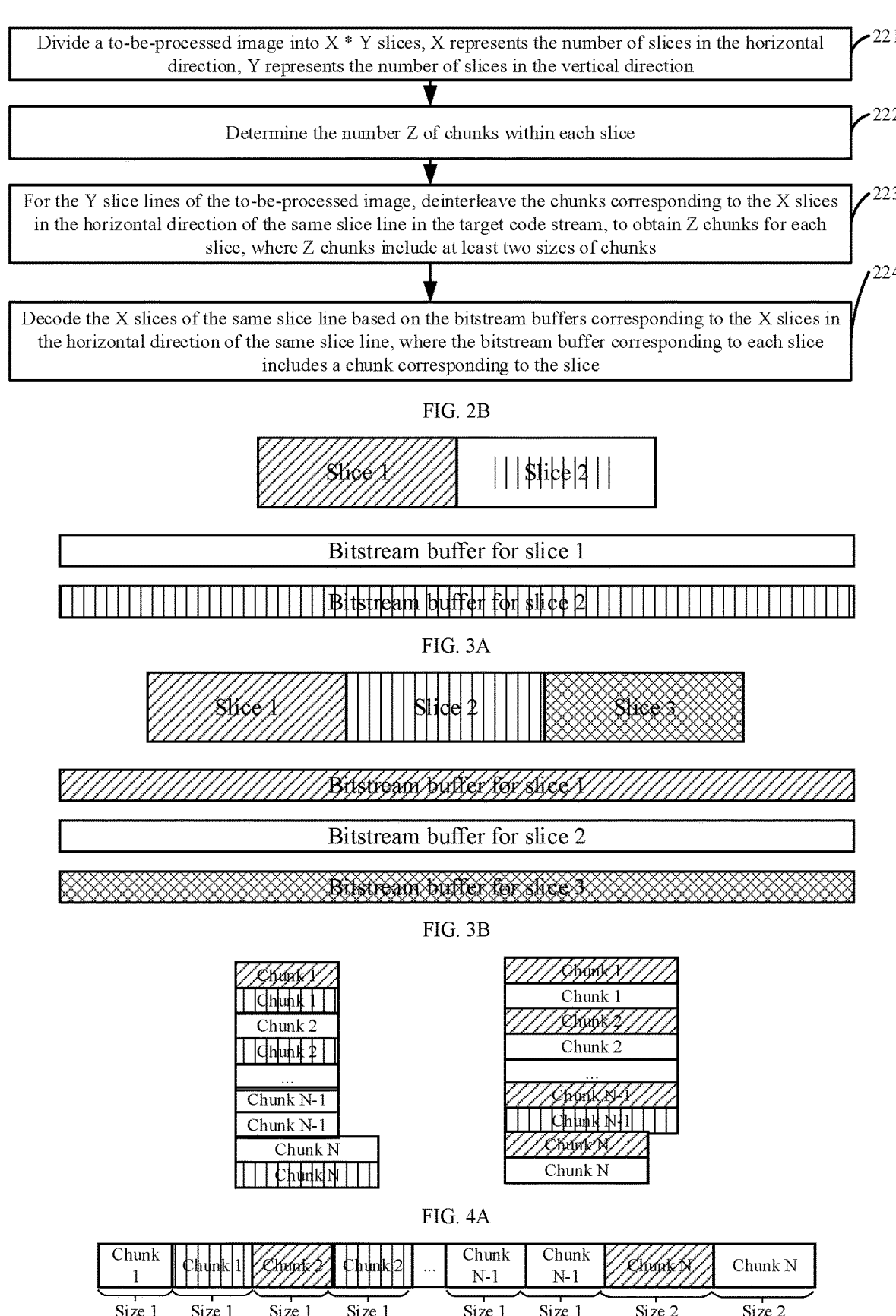

Divide a to-be-processed image into X * Y slices, X represents the number of slices in the horizontal direction, Y represents the number of slices in the vertical direction ⌐221

Determine the number Z of chunks within each slice ⌐222

For the Y slice lines of the to-be-processed image, deinterleave the chunks corresponding to the X slices in the horizontal direction of the same slice line in the target code stream, to obtain Z chunks for each slice, where Z chunks include at least two sizes of chunks ⌐223

Decode the X slices of the same slice line based on the bitstream buffers corresponding to the X slices in the horizontal direction of the same slice line, where the bitstream buffer corresponding to each slice includes a chunk corresponding to the slice ⌐224

FIG. 2B

Slice 1    Slice 2

Bitstream buffer for slice 1

Bitstream buffer for slice 2

FIG. 3A

Slice 1    Slice 2    Slice 3

Bitstream buffer for slice 1

Bitstream buffer for slice 2

Bitstream buffer for slice 3

FIG. 3B

Chunk 1
Chunk 1
Chunk 2
Chunk 2
...
Chunk N-1
Chunk N-1
Chunk N
Chunk N

Chunk 1
Chunk 1
Chunk 2
Chunk 2
...
Chunk N-1
Chunk N-1
Chunk N
Chunk N

FIG. 4A

| Chunk 1 | Chunk 1 | Chunk 2 | Chunk 2 | ... | Chunk N-1 | Chunk N-1 | Chunk N | Chunk N |
|---|---|---|---|---|---|---|---|---|
| Size 1 | Size 1 | Size 1 | Size 1 | | Size 1 | Size 1 | Size 2 | Size 2 |

FIG. 4B

FIG. 6B
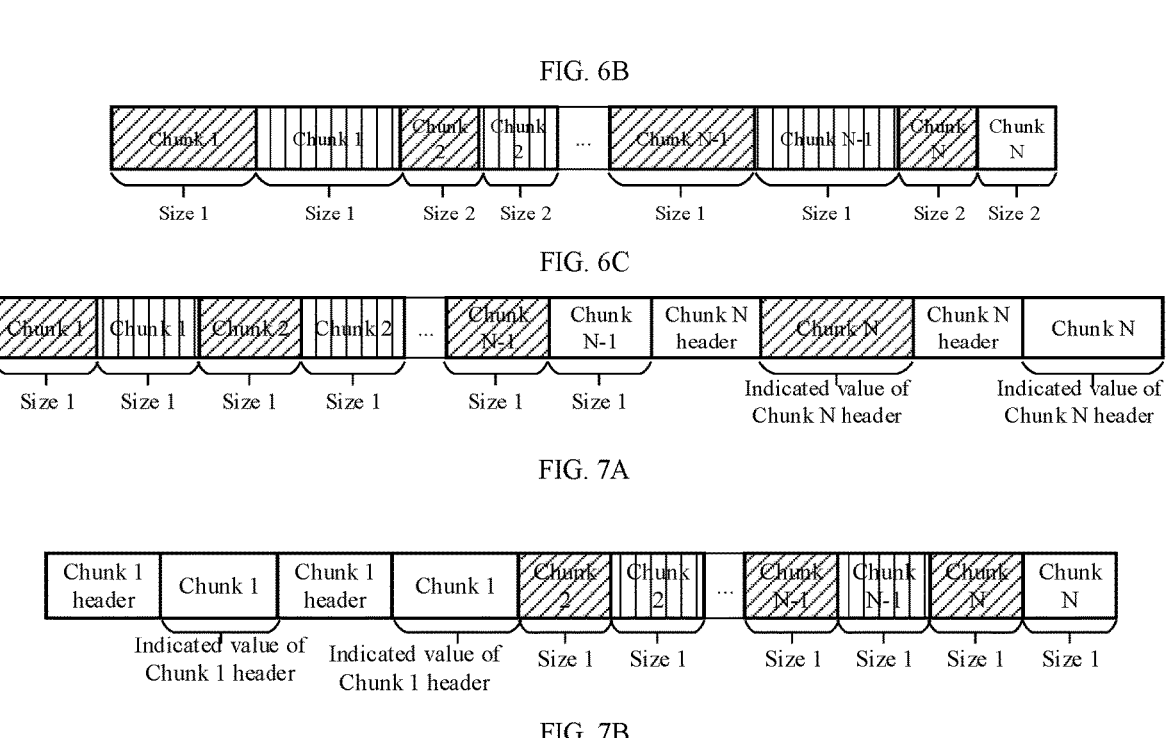
FIG. 6C
FIG. 7A
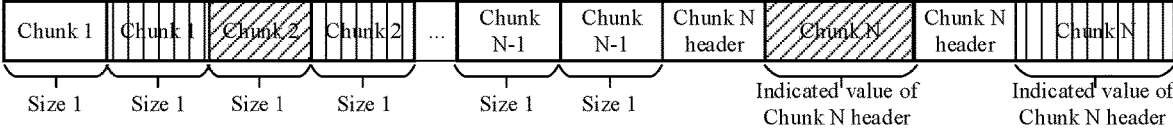
FIG. 7B
FIG. 8A
FIG. 8B
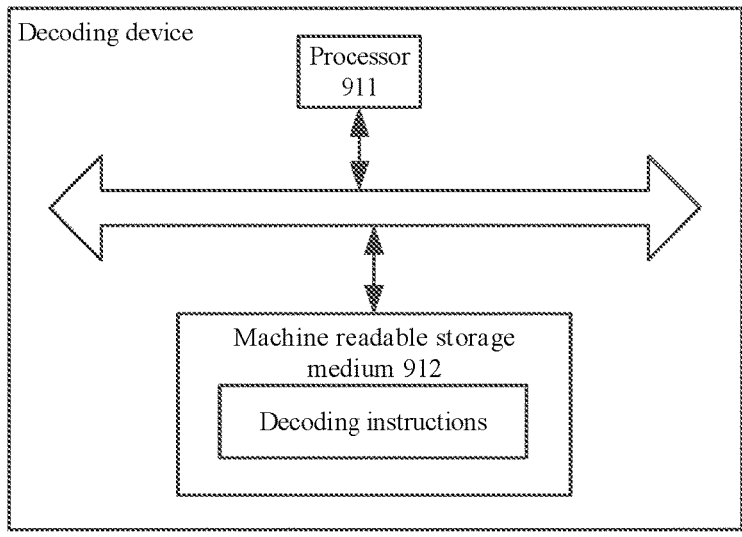
FIG. 9A

ENCODING AND DECODING METHODS AND APPARATUSES, AND DEVICES THEREFOR

This application is a US National Phase of PCT Application No. PCT/CN2023/082182 filed on Mar. 17, 2023, which claims priority to Chinese Patent Application No. 202210273469.7 filed on Mar. 18, 2022, the entire contents of which are incorporated herein by reference in their entireties.

TECHNICAL FIELD

The present disclosure relates to the field of encoding and decoding technology, in particular to encoding and decoding methods and apparatuses, and devices therefor.

BACKGROUND

Video images are transmitted after encoding, and a complete video encoding method can include prediction, transformation, quantization, entropy encoding, filtering, and other processes. The prediction encoding can include intra frame encoding and inter frame encoding. Inter frame encoding utilizes a temporal correlation of a video to predict pixels of a current image by pixels of an adjacent encoded image, achieving the goal of removing temporal redundancy in the video. Intra frame encoding takes into account a strong spatial correlation between adjacent blocks in the current image, using reconstructed surrounding pixels as reference pixels to predict a current uncoded block, which only needs to perform subsequent encoding processing on residual values, rather than to encode original values, effectively removing spatial redundancy.

For each encoding block, prediction is performed on an original input signal to generate a residual signal, which removes temporal and spatial redundancies. Then, transformation is performed on the residual signal to further concentrate energy of the transformed residual signal. Next, the residual signal after transformation is quantized by adjusting the quantization step size. For example, a larger quantization step is used for a high-frequency signal and a smaller quantization step for a low-frequency signal. Therefore, it is ensured that basic information of the image is not lost. Finally, the entropy encoding process is performed, which includes encoding non binary encoding information into binary information, and outputting a binary code stream after removing encoding redundancy, that is, an entropy encoded binary code stream is transmitted.

In the video encoding process, the encoding end needs to divide an image into several non overlapping slices, encode each slice, and sequentially transmit the code stream (i.e., the entropy encoded binary code stream) of each slice to the decoding end. In the video decoding process, the decoding end receives the code stream and performing decoding for each slice based on the stream to obtain a reconstructed image.

For a high-resolution image, the encoding end needs to encode multiple slices in parallel to improve the throughput of the encoding end, and the decoding end needs to perform decoding for the multiple slices in parallel to improve the throughput of the decoding end. Thus, it is necessary to buffer code streams of all slices of the entire image, which requires a large amount of storage resources. Moreover, the decoding end needs to buffer the code streams of all slices before decoding the multiple slices in parallel, which requires a long time to complete buffering and cannot meet the latency requirement of a low latency scenario.

SUMMARY

The present disclosure provides an encoding method including: dividing a to-be-processed image into $X*Y$ slices, where X represents a number of slices in a horizontal direction of the to-be-processed image, Y represents a number of slices in a vertical direction of the to-be-processed image, X is a positive integer greater than 1, and Y is a positive integer greater than or equal to 1; determining a number Z of chunks within each of the $X*Y$ slices, where Z represents a number of the chunks included within each of the $X*Y$ slices; for each of Y slice lines corresponding to the to-be-processed image, encoding X slices in the horizontal direction of the slice line to obtain X bitstream buffers corresponding to the X slices; for each of the X bitstream buffers, dividing the bitstream buffer into Z chunks, where the Z chunks include at least two sizes of chunks; interleaving chunks corresponding to the X slices in the horizontal direction of the slice line to obtain a target code stream; and transmitting the target code stream to a decoding end.

The present disclosure provides a decoding method including: dividing a to-be-processed image into $X*Y$ slices, where X represents a number of slices in a horizontal direction of the to-be-processed image, Y represents a number of slices in a vertical direction of the to-be-processed image, X is a positive integer greater than 1, and Y is a positive integer greater than or equal to 1; determining a number Z of chunks within each of the $X*Y$ slices, where Z represents a number of the chunks included within each of the $X*Y$ slices; for each of Y slice lines corresponding to the to-be-processed image, deinterleaving chunks corresponding to X slices in the horizontal direction of the slice line in a target code stream, to obtain Z chunks for each of the X slices; where the Z chunks include at least two sizes of chunks; and decoding, based on bitstream buffers corresponding to the X slices in the horizontal direction of the slice line, the X slices; where for each of the X slices, a bitstream buffer corresponding to the slice includes the chunks corresponding to the slice.

The present disclosure provides an encoding device including: one or more memories configured to store video data; and an encoder, where the encoder is configured to: divide a to-be-processed image into $X*Y$ slices, where X represents a number of slices in a horizontal direction of the to-be-processed image, Y represents a number of slices in a vertical direction of the to-be-processed image, X is a positive integer greater than 1, and Y is a positive integer greater than or equal to 1; determine a number Z of chunks within each of the $X*Y$ slices, where Z represents a number of the chunks included within each of the $X*Y$ slices; for each of Y slice lines corresponding to the to-be-processed image, encode X slices in the horizontal direction of the slice line to obtain X bitstream buffers corresponding to the X slices; for each of the X bitstream buffers, divide the bitstream buffer into Z chunks, where the Z chunks include at least two sizes of chunks; interleave chunks corresponding to the X slices in the horizontal direction of the slice line to obtain a target code stream; and transmit the target code stream to a decoding end.

The present disclosure provides a decoding device including: one or more memories configured to store video data; and a decoder, where the decoder is configured to: divide a to-be-processed image into $X*Y$ slices, where X represents a number of slices in a horizontal direction of the to-be-processed image, Y represents a number of slices in a vertical direction of the to-be-processed image, X is a positive integer greater than 1, and Y is a positive integer greater than or equal to 1; determine a number Z of chunks within each of the X*Y slices, where Z represents a number of the chunks included within each of the X*Y slices; for each of Y slice lines corresponding to the to-be-processed image, deinterleave chunks corresponding to X slices in the horizontal direction of the slice line in a target code stream, to obtain Z chunks for each of the X slices, where the Z chunks include at least two sizes of chunks; and decode, based on bitstream buffers corresponding to the X slices in the horizontal direction of the slice line, the X slices, where for each of the X slices, a bitstream buffer corresponding to the slice includes the chunks corresponding to the slice.

The present disclosure provides an encoding device including one or more processors and one or more machine-readable storage media, where the one or more machine-readable storage media store a machine executable instruction that can be executed by the one or more processors; and the one or more processors are configured to execute the machine executable instruction to implement the encoding method according to the above embodiment.

The present disclosure provides a decoding device including one or more processors and one or more machine-readable storage media, where the one or more machine-readable storage media store a machine executable instruction that can be executed by the one or more processors; and the one or more processors are configured to execute the machine executable instruction to implement the decoding method according to the above embodiment.

From the above technical solutions, it can be seen that for each slice, the slice can be divided into chunks. The encoding end interleaves all chunks into the target code stream and transmits the target code stream to the decoding end. Correspondingly, the decoding end deinterleaves the chunks in the target code stream to obtain the chunks corresponding to each slice, and decodes the chunks. In this way, the decoding end can decode multiple slices in parallel without buffering all the code streams, which saves storage resources and meets the latency requirement of a low latency scenario.

BRIEF DESCRIPTION OF DRAWINGS

FIGS. 1A-IF are schematic diagrams of encoding and decoding according to embodiments of the present disclosure.

FIGS. 2A and 2B are flowcharts of an encoding method and a decoding method according to embodiments of the present disclosure.

FIGS. 3A and 3B are schematic diagrams of slices according to embodiments of the present disclosure.

FIGS. 4A-4D are schematic diagrams of sizes of chunks according to embodiments of the present disclosure.

FIGS. 5A-5C are schematic diagrams of sizes of chunks according to embodiments of the present disclosure.

FIGS. 6A-6C are schematic diagrams of sizes of chunks according to embodiments of the present disclosure.

FIGS. 7A and 7B are schematic diagrams of sizes of chunks according to embodiments of the present disclosure.

FIGS. 8A and 8B are schematic diagrams of sizes of chunks according to embodiments of the present disclosure.

4

Figure 9B:
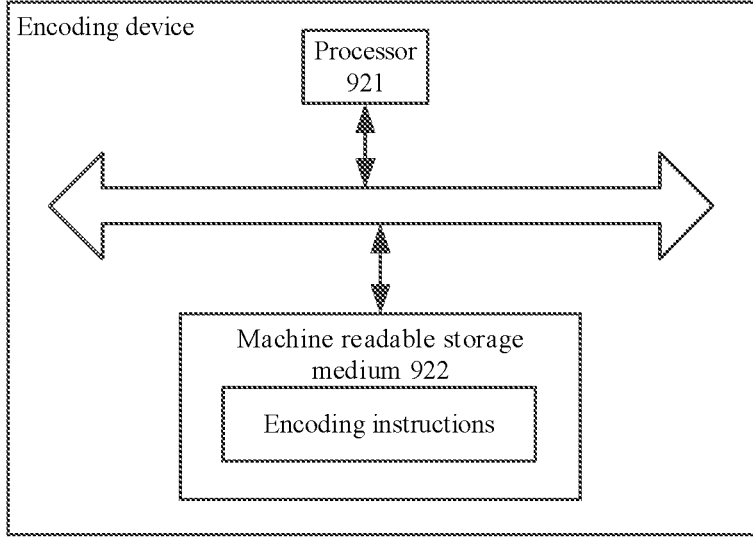
FIG. 9A is a hardware structure diagram of a decoding device according to embodiments of the present disclosure.

FIG. 9B is a hardware structure diagram of an encoding device according to embodiments of the present disclosure.

DETAILED DESCRIPTION

The terms used in the embodiments of the present disclosure are only for the purpose of describing specific embodiments and are not intended to limit the present disclosure. As used in the present disclosure and claims, the singular forms "a", "said", and "the" are intended to include the plural forms as well, unless the context clearly indicates otherwise. It should also be understood that the term "and/or" as used herein is and includes any and all possible combinations of one or more of the associated listed items. It shall be understood that, although the terms "first," "second," "third," and the like may be used herein to describe various information, the information should not be limited by these terms. These terms are only used to distinguish the same type of information from each other. For example, without departing from the scope of the present disclosure, first information may also be referred to as second information, and similarly, second information may also be referred to as the information. Depending on the context, in addition, the word "if" can be interpreted as "when", "upon", or "in response to determining that".

In order to enable those skilled in the art to better understand the technical solutions of the present disclosure, the following is a brief explanation of the technical terms.

Image width (image_width): is a 16 bit unsigned integer that represents the width of the luma component of an image, i.e., the number of samples in the horizontal direction. The unit of image_width is the number of samples per line of the image, where the sample at the upper left corner of the visible region is aligned with the sample at the upper left corner of the image. The value of image_width is not 0 and is an integer multiple of 16.

Image height (image_height): is a 16 bit unsigned integer that represents the height of the luma component of an image, i.e., the number of scanning lines in the vertical direction. The unit of image_height is the number of lines of the image samples, and the value of image_height is not 0 and can be an integer multiple of 2.

Regarding real width (real_width) of an image and real height (real_height) of an image, a relationship between the boundary of the image and the real_width and real_height is shown in FIG. 1A. The solid line represents the boundary of the visible region of the image, and the width and height of the visible region are respectively determined by the real_width and real_height. The dashed line represents the boundary of the image, and the width and height of the boundary of the image are respectively determined by image_width and image_height. In the subsequent embodiments, it is introduced with image_width and image_height as examples.

Slice: is a fixed rectangular region in an image that can contain several encoding units. The slices do not overlap with each other. As shown in FIG. 1B, taking slices A, B, C, D, E, F, G, H, and I as examples, each slice can include multiple encoding units. FIGS. 1C-1 to 1C-3 show three types of structural relationships of slices, with FIG. 1C-1 showing the structural relationship of four slices, FIG. 1C-2 showing the structural relationship of two slices, and FIG. 1C-3 showing the structural relationship of eight slices.

Slice width (slice_width) and slice height (slice_height): are parameters set by the encoding end, respectively representing the width and height of a slice. Taking a coding unit (CU) as the unit, SliceNumX represents the number of slices in an image in the horizontal direction, and SliceNumY represents the number of slices in an image in the vertical direction. The distribution relationship between slices, slice width, and slice height can be seen in FIG. 1D.

For example, SliceNumX and SliceNumY can be calculated as:

$$SliceNumX = (\text{image\_width} + \text{slice\_width} - 1)/\text{slice\_width};$$

and $$SliceNumY = (\text{image\_height} + \text{slice\_height} - 1)/\text{slice\_height}.$$

Bit per pixel (bpp): represents the average number of bits required to represent each pixel. For example, for a 10 bit YUV444 format original image, bpp is 30.

Target bit per pixel (target bpp): is a parameter specified by the encoding end, representing the average number of bits required to represent each pixel after compression. For example, for a 10 bit YUV444 format original image, the target bpp is 5. Thus, when bpp is 30, it indicates a compression of 6 times.

The video encoding framework applicable to the present disclosure can be seen in FIG. 1E, and a processing flow of the encoding end of the embodiments of the present disclosure can be implemented by the video encoding framework. A schematic diagram of a video decoding framework is similar to FIG. 1E and will not be repeated here. The video decoding framework can be used to implement the processing flow of the decoding end of the embodiments of the present disclosure. The video encoding framework and the video decoding framework can include modules such as an intra frame prediction module, a motion estimation/compensation module, a reference image buffer, an in loop filtering module, a reconstruction module, a transformation module, a quantization module, an inverse transformation module, an inverse quantization module, and an entropy encoder, etc. At the encoding end, the processing flow of the encoding end can be achieved through the cooperation between these modules. At the decoding end, the processing flow of the decoding end can be achieved through the cooperation between these modules.

For example, prediction is divided into intra frame prediction and inter frame prediction. Intra frame prediction takes into account the strong spatial correlation between adjacent blocks in an image. Reconstructed surrounding pixels can be used as reference pixels to predict the current unencoded block, which only needs to perform subsequent encoding processing on the residual signal (original signal-prediction signal), rather than to encode original signal, effectively removing spatial redundancy. Inter frame prediction utilizes a temporal correlation of a video signal to predict pixels of a current image by pixels of an adjacent encoded image, achieving the goal of removing temporal redundancy in the video.

For example, in the process of video encoding, transformation refers to transforming an image described in the form of pixels in the spatial domain into an image in the transform domain, and representing it in the form of transformation coefficients. Since the vast majority of images contain many flat and slowly changing regions, appropriate transformation can transform the dispersed distribution of image energy in the spatial domain into a relatively concentrated distribution in the transform domain, which can remove the frequency domain correlation between signals. In this way, the transformation process combined with the quantization process can effectively compress the code stream.

For example, entropy encoding refers to lossless encoding based on the principle of information entropy, which is the last processing module in video encoding compression, converts a series of element symbols used to represent a video sequence into a binary code stream for transmission or storage. The element symbols input to the entropy encoding module may include quantized transform coefficients, motion vector information, prediction mode information, and transform quantization related syntax, etc. The output data of the entropy encoding module is the final compressed code stream for the original video. Entropy encoding can effectively remove the statistical redundancy of these element symbols and is one of the important tools to ensure the compression efficiency of video encoding.

As shown in FIG. 1F, in the video encoding process, the encoding of each image block (i.e., encoding block) generally includes prediction, transformation, quantization, and entropy encoding, etc. For each encoding block, prediction is performed on the original input signal to generate a residual signal, which removes the temporal and spatial redundancies, and then transformation is performed on the residual signal to further concentrate the energy of the residual signal. Next, quantization is performed through adjusting the quantization step size (including using a larger quantization step size for a high-frequency signal and a smaller quantization step size for a low-frequency signal) to ensure that the basic information of the image is not lost. Finally, non binary encoded information is encoded into binary information through entropy encoding, and the encoding redundancy is removed before outputting a binary code stream.

In the process of video encoding, an image needs to be divided into several non overlapping rectangular slices, with each slice containing an integer number of non overlapping encoding blocks. Each slice is independently encoded in sequence (as shown in FIG. 1F, the encoding process involves prediction, transformation, quantization, entropy encoding, and other modules to generate a binary code stream). Then, the code stream of each slice is concatenated together to form the final code stream, and the final code stream is transmitted to the decoding end. Corresponding to the encoding end, in the video decoding process, the image is first divided into multiple rectangular slices that are consistent with the encoding end. The decoding end receives the code stream and sequentially decodes each slice (decoding each encoding block in a slice includes entropy decoding, inverse quantization, inverse transformation, and prediction, etc.), to obtain the reconstructed pixels of each rectangular slice. The reconstructed pixels of each slice are concatenated together to obtain the reconstructed image.

For a high-resolution image, the encoding end needs to encode multiple slices in parallel to improve the throughput of the encoding end, and the decoding end needs to perform decoding for the multiple slices in parallel to improve the throughput of the decoding end. To achieve this goal, it is necessary to buffer code streams of all slices of the entire image, which requires a large amount of storage resources. Moreover, it takes a long time for the decoding end to buffer all the code streams of the slices, which cannot meet the latency requirement of a low latency scenario.

In response to the above findings, a code stream grouping method is designed in the embodiments of the present disclosure. In other words, the encoding end divides each slice into multiple chunks, where each chunk consists of a code stream with multiple bytes, and then performs bit stream interleaving encoding on the chunks of each slice within a slice line. In this way, parallel decoding can be achieved by buffering several chunks, greatly reducing decoding latency and minimizing the buffer size of code streams at the decoding end. For example, for each slice, the slice can be divided into multiple chunks, and the encoding end interleaves all chunks into the target code stream and transmits the target code stream to the decoding end. Correspondingly, the decoding end deinterleaves the chunks in the target code stream to obtain the chunks for each slice, and decodes the chunks. In this way, the decoding end can decode multiple slices in parallel without buffering all the code streams, saving storage resources and enabling parallel decoding even in a low latency scenario.

The following provides a detailed explanation of the encoding and decoding methods of the embodiments of the present disclosure, based on several specific embodiments.

Embodiment 1

As shown in FIG. 2A, FIG. 2A is a flowchart of the encoding method proposed in an embodiment of the present disclosure. The method can be applied to the encoding end (such as a video encoder) and may include the following steps 211 to 216.

In step 211, a to-be-processed image is divided into X*Y slices. X represents the number of slices in a horizontal direction in an image, which can also be hereinafter referred to as SliceNumX. Y represents the number of slices in a vertical direction in the image, which can also be hereinafter referred to as SliceNumY. X can be a positive integer greater than 1, and Y can be a positive integer greater than or equal to 1. For example, as shown in FIG. 1B, X is 3 and Y is 3. As shown in FIG. 1C-1, X is 2 and Y is 2. As shown in FIG. 1C-2, X is 2 and Y is 1. As shown in FIG. 1C-3, X is 4 and Y is 2.

In step 212, the number Z of chunks within each slice is determined. Z represents the number of chunks within the same slice, which can also be hereinafter referred to as ChunkNum.

In an embodiment, the number of chunks within each slice can be determined based on the target transmission bits number (also known as total resources). For example, the target transmission bits number can be determined based on a slice width, a slice height, and the target bit per pixel, and the number of chunks can be determined based on the target transmission bits number and the configured chunk size value.

The target transmission bits number is the sum of the bits occupied by all pixels within a slice. For example, the total number of pixels within a slice can be determined based on the slice width and slice height, and the target transmission bits number can be determined based on the total number of pixels and the target bit per pixel.

The configured chunk size value is used to represent the length of the chunk, which can be a preset value configured based on experience or a value indicated by syntax parameters (such as image level syntax parameters, or sequence level syntax parameters, etc.), which is not limited. The target transmission bits number represents the lengths of all chunks, and the chunk size value represents the length of one chunk. Therefore, based on the target transmission bits number and the chunk size value, the number of chunks can be determined.

In another embodiment, the number of chunks can be determined based on the slice height. For example, if the size of the slice is slice_width*slice_height (i.e., there are a total of slice_width*slice_height pixels, each slice line has slice_width pixels, and there is a total of slice_height slice lines). In a case that the length of the chunk is determined based on slice_width, then the number of chunks can be determined based on slice_height. For example, if the length of the chunk is slice_width, then the number of chunks can be slice_height, or if the length of the chunk is slice_width/2, then the number of chunks can be 2*slice_height, or if the length of the chunk is 2*slice_width, then the number of chunks can be slice_height/2. The above are only examples, which is not limited in the present disclosure.

In step 213, for the Y slice lines corresponding to the to-be-processed image, the X slices in the horizontal direction of the same slice line are encoded to obtain the corresponding X bitstream buffers. Since the processing of each slice line is the same, it takes the processing of one slice line as an example hereinafter.

For example, X slices of the slice line can be encoded to obtain corresponding X bitstream buffers. As shown in FIG. 1B, the first slice line is first encoded, for example, slice A, slice B, and slice C are encoded in parallel to obtain the bitstream buffer A1 corresponding to slice A, the bitstream buffer B1 corresponding to slice B, and the bitstream buffer C1 corresponding to slice C.

After the encoding of the first slice line is completed, the second slice line is encoded, i.e., slices D, E, and F are encoded. For example, slice D, slice E, and slice F are encoded in parallel, to obtain the bitstream buffer D1 corresponding to slice D, the bitstream buffer E1 corresponding to slice E, and the bitstream buffer F1 corresponding to slice F.

After the encoding of the second slice line is completed, the third slice line is encoded, i.e., slices G, H, and I are encoded. For example, slice G, slice H, and slice I are encoded in parallel, to obtain the bitstream buffer G1 corresponding to slice G, the bitstream buffer H1 corresponding to slice H, and the bitstream buffer I1 corresponding to slice I.

In step 214, for each bitstream buffer, the bitstream buffer is divided into Z chunks. Where the Z chunks include at least two sizes of chunks.

For example, for chunks with two different sizes, the size can be the length of the chunk.

For example, after the encoding of the first slice line is completed, the bitstream buffer A1 corresponding to slice A, the bitstream buffer B1 corresponding to slice B, and the bitstream buffer C1 corresponding to slice C can be obtained. Based on this, the bitstream buffer A1 can be divided into Z chunks, denoted as chunks A11, A12, . . . , the bitstream buffer B1 can be divided into Z chunks, denoted as chunks B11, B12, . . . , and the bitstream buffer C1 can be divided into Z chunks, denoted as chunks C11, C12, . . . .

In the Z chunks corresponding to bitstream buffer A1, there are at least two sizes of chunks. In the Z chunks corresponding to bitstream buffer B1, there are at least two sizes of chunks. In the Z chunks corresponding to bitstream buffer C1, there are at least two sizes of chunks.

In step 215, the chunks corresponding to X slices in the horizontal direction of the same slice line are interleaved, to obtain the target code stream.

For example, the chunk A11 corresponding to slice A can be added to the current code stream first, then the chunk B11 corresponding to slice B can be added to the current code stream, then the chunk C11 corresponding to slice C can be added to the current code stream, then the chunk A12 corresponding to slice A can be added to the current code stream, then the chunk B12 corresponding to slice B can be added to the current code stream, and then the chunk C12 corresponding to slice C can be added to the current code stream, and so on, to finally obtain the target code stream. In the target code stream, a chunk corresponding to one slice is connected together with a chunk corresponding to another slice, rather than with another chunk corresponding to that slice. In other words, the target code stream is formed by interleaving chunks corresponding to different slices.

In the target code stream, before adding the last chunk of a slice to the target code stream, a chunk of another slice needs to be added to the target code stream. For example, before adding the last chunk of slice A to the target code stream, it is necessary to add a chunk of slice B to the target code stream; and before adding the last chunk of slice B to the target code stream, it is also necessary to add a chunk of slice A to the target code stream.

In an embodiment, based on the order of X slices in the horizontal direction in the same slice line, a chunk (in practical applications, it can also be at least two chunks, which is not limited in the present disclosure, taking one chunk as an example in this embodiment) of each of the X slices in the same slice line is sequentially added to the current code stream, and it is determined whether all chunks have been added to the current code stream. If so, stop adding chunks and the current code stream is used as the target code stream. If not, return to execute the operation of sequentially adding one chunk corresponding to each of the X slices to the current code stream based on the order of X slices in the horizontal direction in the slice line.

For example, for slices A, B, and C arranged in sequence in the horizontal direction, a chunk A11 corresponding to slice A, a chunk B11 corresponding to slice B, and a chunk C11 corresponding to slice C can be sequentially added to the current code stream, and it can be determined whether all chunks of slices A, B, and C have been added to the current code stream. If so, stop adding chunks, the processing of the current slice line is completed, and the current code stream of the current slice line is obtained as the target code stream.

If not, it is continued to add one chunk corresponding to slice A, one chunk corresponding to slice B, and one chunk corresponding to slice C to the current code stream, and determine whether all chunks have been added to the current code stream. This process is repeated until all chunks are added to the current code stream, the processing of the current slice line is completed, and the target code stream is obtained.

In an embodiment, when the chunks corresponding to X slices have been obtained, it is started to interleave the chunks corresponding to X slices, to obtain the target code stream. Where the chunks corresponding to X slices have been obtained, including: for each slice, S chunks corresponding to the slice have been obtained, where S is greater than or equal to 1 and S is less than the number of chunks.

For example, after the encoding of the first slice line is completed, the bitstream buffer A1 corresponding to slice A, the bitstream buffer B1 corresponding to slice B, and the bitstream buffer C1 corresponding to slice C are obtained, and first the chunk A11 is divided from the bitstream buffer A1, the chunk B11 is divided from the bitstream buffer B1, and the chunk C11 is divided from the bitstream buffer C1. Then, chunk A12 is divided from the code stream buffer A1, chunk B12 is divided from the code stream buffer B1, and chunk C12 is divided from the code stream buffer C1. Then, chunk A13 is divided from the code stream buffer A1, chunk B13 is divided from the code stream buffer B1, and chunk C13 is divided from the code stream buffer C1, and so on.

On this basis, when chunks A11, B11, and C11 have been obtained, it can be started to interleave these chunks to obtain the target code stream. Alternatively, when chunks A11, B11, C11, A12, B12, and C12 have been obtained, it can be started to interleave these chunks to obtain the target code stream. Alternatively, when chunks A11, B11, C11, A12, B12, C12, A13, B13, and C13 have been obtained, it can be started to interleave these chunks to obtain the target code stream, and so on. Obviously, when S chunks corresponding to each slice have been obtained, it can be started to interleave the chunks corresponding to X slices to obtain the target code stream. S should be greater than or equal to 1 and less than the number of chunks.

In step 216, the target code stream is transmitted to the decoding end, where the target code stream includes chunks of X slices in the horizontal direction.

As shown in FIG. 2B, FIG. 2B is a flowchart of a decoding method proposed in another embodiment of the present disclosure. The method can be applied to a decoding end (such as a video decoder). The method may include the following steps 221 to 224.

In step 221, a to-be-processed image is divided into X*Y slices. X represents the number of slices in the horizontal direction in the image, which can also be hereinafter referred to as SliceNumX. Y represents the number of slices in the vertical direction in the image, which can also be hereinafter referred to as SliceNumY. X can be a positive integer greater than 1, and Y can be a positive integer greater than or equal to 1, which is consistent with the parameters for the encoding end.

In step 222, the number Z of chunks within each slice is determined.

In an embodiment, the number of chunks within each slice can be determined based on the target transmission bits number (also known as total resources). For example, the target transmission bits number can be determined based on a slice width, a slice height, and the target bit per pixel, and the number of chunks can be determined based on the target transmission bits number and a configured chunk size value.

In another embodiment, the number of chunks can be determined based on the slice height.

For example, steps 221-222 can refer to steps 211-212, which will not be repeated here.

In step 223, for the Y slice lines of the to-be-processed image, the chunks corresponding to the X slices in the horizontal direction of the same slice line in the target code stream are deinterleaved, to obtain Z chunks for each slice. Where Z chunks include at least two sizes of chunks. For example, the decoding end can receive the target code stream from the encoding end. The target code stream can include chunks corresponding to X slices in the horizontal direction of the same slice line. Therefore, the decoding end can deinterleave the chunks corresponding to X slices in the horizontal direction of the same slice line in the target code stream, to obtain Z chunks corresponding to each slice. Since the processing of each slice line is the same, it takes the processing of one slice line as an example hereinafter.

For example, X slices of a slice line are slice A, slice B, and slice C. First the chunk A11 corresponding to slice A is parsed from the target code stream, then the chunk B11 corresponding to slice B is parsed from the target code stream, then the chunk C11 corresponding to slice C is parsed from the target code stream, then the chunk A12 corresponding to slice A is parsed from the target code stream, then the chunk B12 corresponding to slice B is parsed from the target code stream, and finally the chunk C12 corresponding to slice C is parsed from the target code stream, and so on, to obtain Z chunks corresponding to each slice.

Therefore, before the last chunk of a slice is parsed from the target code stream, it is necessary to parse a chunk of another slice from the target code stream. For example, before the last chunk of slice A is parsed, it is necessary to parse a chunk of slice B; and before the last chunk of slice B is parsed, it is also necessary to parse a chunk of slice A.

In an embodiment, based on the order of X slices in the horizontal direction in the same slice line, a chunk (in practical applications, it can also be at least two chunks, which is not limited in the present disclosure, taking one chunk as an example) of each of the X slices in the same slice line is sequentially parsed into the bitstream buffer corresponding to that slice, and it is determined whether all chunks have been parsed. In response to determining that all the Z chunks of each of the X slices have been parsed, the deinterleaving for the X slices is completed and all the Z chunks of each of the X slices are obtained. In response to determining that parsing all the Z chunks of each of the X slices has not finished, it is returned to an operation of sequentially parsing, based on an order of the X slices in the horizontal direction in the same slice line, one chunk corresponding to each of the X slices into a bitstream buffer corresponding to the slice.

For example, for slices A, B, and C arranged in sequence in the horizontal direction, one chunk A11 corresponding to slice A is parsed into the bitstream buffer A1 corresponding to slice A, one chunk B11 corresponding to slice B is parsed into the bitstream buffer B1 corresponding to slice B, and one chunk C11 corresponding to slice C is parsed into the bitstream buffer C1 corresponding to slice C, and it is determined whether all chunks of slice A, slice B, and slice C have been parsed. If all the Z chunks of each of the X slices have been parsed, the deinterleaving for the X slices is completed and all the Z chunks of each of the X slices are obtained. If parsing all the Z chunks of each of the X slices has not finished, it is continued to parse one chunk corresponding to slice A to bitstream buffer A1, one chunk corresponding to slice B to bitstream buffer B1, one chunk corresponding to slice C to bitstream buffer C1, and so on until all chunks have been parsed, and the deinterleaving of X slices is completed and all Z chunks corresponding to each slice are obtained.

In summary, Z chunks corresponding to slice A can be obtained, where Z chunks include at least two sizes of chunks; Z chunks corresponding to slice B can be obtained, where Z chunks include at least two sizes of chunks; and Z chunks corresponding to slice C can be obtained, where Z chunks include at least two sizes of chunks.

In step 224, for the Y slice lines of the to-be-processed image, the X slices of the same slice line are decoded based on the bitstream buffers corresponding to the X slices in the horizontal direction of the same slice line. The bitstream buffer corresponding to each slice includes a chunk (such as at least one chunk) corresponding to the slice.

For example, the bitstream buffer A1 corresponding to slice A may include chunks A11, A12, A13, . . . corresponding to slice A, the bitstream buffer B1 corresponding to slice B may include chunks B11, B12, B13, . . . corresponding to slice B, and the bitstream buffer C1 corresponding to slice C may include chunks C11, C12, C13, . . . corresponding to slice C. On this basis, chunks A11, B11, and C11 can be decoded, e.g., in parallel, the decoding process is not limited. Then, chunks A12, B12, and C12 can be decoded, e.g., in parallel. Then, the chunks A13, B13, and C13 can be decoded, e.g., in parallel, and so on, until the decoding process of all the chunks of the X slices in the horizontal direction is completed.

In an embodiment, when chunks corresponding to the X slices exist in the bitstream buffers corresponding to the X slices, decoding of the chunks corresponding to the X slices starts. Where the chunks corresponding to the X slices existing in the bitstream buffer corresponding to the X slices can include but is not limited to: for each of the slices, T chunks of the slice exist in the bitstream buffer corresponding to the slice, where T is greater than or equal to 1 and T is less than the number of the chunks.

Since decoding of the chunks corresponding to the X slices begins when there are T chunks in a bitstream buffer, before the last set of chunks are deinterleaved, the X slices can be decoded based on the bitstream buffers corresponding to the X slices in the horizontal direction. In practical applications, decoding of the X slices based on the bitstream buffers corresponding to the X slices in the horizontal direction can be performed after the last set of chunks are deinterleaved.

For example, the decoding end first parses chunks A11, B11, and C11 from the target code stream, buffers chunk A11 in bitstream buffer A1, buffers chunk B11 in bitstream buffer B1, and buffers chunk C11 in bitstream buffer C1; then parses chunks A12, B12, and C12 from the target code stream, and buffers chunk A12 in bitstream buffer A1, buffers chunk B12 in bitstream buffer B1, and buffers chunk C12 in bitstream buffer C1; and then parses chunks A13, B13, and C13 from the target code stream, and buffers chunk A13 in bitstream buffer A1, buffers chunk B13 in bitstream buffer B1, and buffers chunk C13 in bitstream buffer C1, and so on.

For example, the sizes of chunks interleaved each time by the encoding end are the same, and the sizes of chunks deinterleaved each time by the decoding end are the same. For example, the sizes of chunks A11, B11, and C11 are the same, and the sizes of chunks A12, B12, and C12 are also the same. However, the size of chunk A11 may be the same with or different from the size of chunk A12. For the relationship of sizes of different chunks, please refer to the subsequent embodiments.

On this basis, when there are chunks A11, B11, and C11 in these bitstream buffers, these chunks can be decoded. Alternatively, decoding of chunks only begins when there are chunks A11, B11, C11, A12, B12, and C12 in these bitstream buffers. Alternatively, decoding of chunks only begins when there are chunks A11, B11, C11, A12, B12, C12, A13, B13, and C13 in these bitstream buffers, and so on. When there are T chunks in the bitstream buffer corresponding to each slice, decoding of the X slices based on the bitstream buffers corresponding to the horizontal X slices can begin. T is greater than or equal to 1 and less than the number of chunks.

In an embodiment, at least two sizes of chunks have the following cases.

Case 1: in a case that a length of a real encoded bits number is fixed, for Z chunks, a length of each of one or more remaining chunks except a k-th chunk is a first size, and a length of the k-th chunk is a second size.

For the encoding end and the decoding end, the first size is determined based on the configured chunk size value, and the second size is determined based on a target transmission bits number, the chunk size value, and the number of chunks.

Case 2: in a case that a length of a real encoded bits number is fixed, for Z chunks, a length of each of one or more remaining chunks except a k-th chunk is a first size, and a length of the k-th chunk is a second size.

For the encoding end and the decoding end, the first size is determined based on the slice width and the bit per pixel, and the second size is determined based on the target transmission bits number, the first size, and the number of chunks.

Case 3: in a case that a length of a real encoded bits number is fixed, for Z chunks, the set of chunks includes remaining chunks except the k-th chunk, where the length of each of one or more odd numbered chunks in the set is the first size, the length of each of one or more even numbered chunks is the second size, and the length of the k-th chunk is the third size.

For the encoding end and the decoding end, the first size is determined based on the sum of the chunk size value and a preset value, the second size is determined based on the difference between the chunk size value and the preset value, and the third size is determined based on the target transmission bits number, the chunk size value, and the number of chunks.

Case 4: in a case that a length of a real encoded bits number is fixed, for Z chunks, the set of chunks includes remaining chunks except the k-th chunk, where the length of each of one or more odd numbered chunks in the set is the first size, the length of each of one or more even numbered chunks is the second size, and the length of the k-th chunk is the third size.

For the encoding end and the decoding end, the first size is determined based on the sum of the number of pixels of a slice line and the preset value, the second size is determined based on the difference between the number of pixels of a slice line and the preset value, and the third size is determined based on the target transmission bits number, the number of pixels of a slice line, and the number of chunks. Where the number of pixels in a slice line can be determined based on the slice width and the bit per pixel.

Case 5: in a case that the length of the real encoded bits number is fixed, for Z chunks, the length of each of one or more odd numbered chunks is the first size, and the length of each of one or more even numbered chunks is the second size.

For the encoding end and the decoding end, the first size is determined based on the sum of the configured chunk size value and the preset value, and the second size is determined based on the difference between the chunk size value and the preset value.

Case 6: in a case that the length of the real encoded bits number is fixed, for Z chunks, the length of each of one or more odd numbered chunks is the first size, and the length of each of one or more even numbered chunks is the second size.

For the encoding end and the decoding end, the first size is determined based on the sum of the number of pixels of a slice line and the preset value, and the second size is determined based on the difference between the number of pixels in a slice line and the preset value. Where the number of pixels in a slice line can be determined based on the slice width and the bit per pixel.

Case 7: in a case that a length of a real encoded bits number is not fixed, for Z chunks, a length of each of one or more remaining chunks except a k-th chunk is a first size, and a length of the k-th chunk is a second size.

For the encoding end, the first size is determined based on the configured chunk size value, and the second size is determined based on a real encoded bits number of a bitstream buffer, the chunk size value, and the number of chunks. When the encoding end transmits the target code stream to the decoding end, the target code stream may further include chunk length indicating information for indicating the second size.

For the decoding end, the first size is determined based on the configured chunk size value, and the second size is determined based on the chunk length indicating information. For example, the target code stream includes chunk length indicating information for indicating the second size, and the decoding end can parse the chunk length indicating information from the target code stream and determine the second size based on the chunk length indicating information.

Case 8: in a case that a length of a real encoded bits number is not fixed, for Z chunks, a length of each of one or more remaining chunks except a k-th chunk is a first size, and a length of the k-th chunk is a second size.

For the encoding end, the first size is determined based on the slice width and the bit per pixel, and the second size is determined based on the real encoded bits number in the bitstream buffer, the first size, and the number of chunks. When the encoding end transmits the target code stream to the decoding end, the target code stream may further include chunk length indicating information for indicating the second size.

For the decoding end, the first size is determined based on the slice width and the bit per pixel, and the second size is determined based on the chunk length indicating information in the target code stream. For example, the decoding end can parse the chunk length indicating information used to indicate the second size from the target code stream, and determine the second size based on the chunk length indicating information.

Case 9: in a case that a length of a real encoded bits number is fixed, for Z chunks, a length of each of one or more remaining chunks except a k-th chunk is a first size, and a length of the k-th chunk is a second size.

For the encoding end, the first size is determined based on the configured chunk size value, and the second size is determined based on a target transmission bits number, the chunk size value, and the number of chunks. When the encoding end transmits the target code stream to the decoding end, the target code stream may further include chunk length indicating information for indicating the second size.

For the decoding end, the first size is determined based on the configured chunk size value, and the second size is determined based on the chunk length indicating information in the target code stream. For example, the decoding end can parse the chunk length indicating information used to indicate the second size from the target code stream, and determine the second size based on the chunk length indicating information.

Case 10: in a case that a length of a real encoded bits number is fixed, for Z chunks, a length of each of one or more remaining chunks except a k-th chunk is a first size, and a length of the k-th chunk is a second size.

For the encoding end, the first size is determined based on the slice width and the bit per pixel, and the second size is determined based on the target transmission bits number, the first size, and the number of chunks. When the encoding end transmits the target code stream to the decoding end, the target code stream may further include chunk length indicating information for indicating the second size.

For the decoding end, the first size is determined based on the slice width and the bit per pixel, and the second size is determined based on the chunk length indicating information in the target code stream. For example, the decoding end can parse the chunk length indicating information used to indicate the second size from the target code stream, and determine the second size based on the chunk length indicating information.

In cases 1 to 4 and cases 7 to 10 mentioned above, the k-th chunk can be the last chunk of all chunks, the first chunk of all chunks, or any one chunk between the first and last chunks in all chunks. The k-th in different cases is not relevant, here only the k-th is used to represent the sequence number of the chunk in the set of chunks.

In the above cases 1 to 10, the first size in different cases is not relevant. Here, only the first size is used to represent the length of the chunk. In other words, the first size in case 1 and the first size in case 2 can be the same or different. Similarly, the second size in different cases is not relevant. Here, the second size is only used to represent the length of the chunk.

In an embodiment, for the encoding end and the decoding end, the number of chunks within each slice is the same, which ensures parallel decoding.

From the above technical solutions, it can be seen that in the embodiments of the present disclosure, for each slice, the slice can be divided into chunks. The encoding end interleaves all chunks into the target code stream and transmits the target code stream to the decoding end. Correspondingly, the decoding end deinterleaves the chunks in the target code stream to obtain the chunks corresponding to each slice, and decodes the chunks. In this way, the decoding end can decode multiple slices in parallel without buffering all the code streams, which saves storage resources and meets the latency requirement of a low latency scenario.

For example, the process of interleaving the chunks by the encoding end includes: the encoding end first adds the chunk A1 of slice A to the target code stream, then adds the chunk B1 of slice B to the target code stream, then adds the chunk A2 of slice A to the target code stream, and then adds the chunk B2 of slice B to the target code stream, and so on. Correspondingly, the process of deinterleaving the chunks by the decoding end includes: the decoding end deinterleaves the chunks A1 and B1 from the target code stream, buffers the chunk A1 into the bitstream buffer of slice A, buffers the chunk B1 into the bitstream buffer of slice B, deinterleaves the chunks A2 and B2 from the target code stream, buffers the chunk A2 into the bitstream buffer of slice A, and buffers the chunk B2 into the bitstream buffer of slice B, and so on. In this way, after the chunks A1 and B1 are buffered into their respective bitstream buffers, without the need to wait until the subsequent chunks A2 and B2 are also buffered into their respective bitstream buffers, the chunks A1 and B1 can be decoded in parallel, thereby reducing waiting time and meeting the latency requirement of a low latency scenario. After parallel decoding of chunks A1 and B1, the chunks A1 and B1 can be deleted from their respective bitstream buffers to save storage resources.

Embodiment 2

The embodiments of the present disclosure propose an encoding method that can be applied to the encoding end. The method may include the following first to sixth steps.

The first step is to divide the image horizontally and vertically into multiple rectangular slices.

The second step is to calculate the total resources (i.e., the target transmission bits number) and determine the number (ChunkNum) of chunks based on the total resources.

The third step is to sequentially encode multiple slices within each slice line to obtain multiple bitstream buffers.

The fourth step is to divide each bitstream buffer into ChunkNum chunks.

For example, ChunkNum chunks include at least two sizes of chunks.

The fifth step is, for all slices within a slice line, to encode for ChunkNum times in sequence, each time interleaving a chunk of each of all slices to form a code stream. Since there are ChunkNum chunks in each slice, encoding for ChunkNum times can interleave all chunks of each slice together to form a code stream.

In an embodiment, after chunks corresponding to all SliceNumX slices within a slice line have been obtained, the interleaving of the chunks corresponding to all SliceNumX slices begins to obtain the code stream. Where the chunks corresponding to all SliceNumX slices have been obtained, including: for each slice, S chunks corresponding to the slice have been obtained, where S is greater than or equal to 1 and S is less than the number of chunks.

The sixth step is to determine whether all slice lines have been encoded. If not, return to the third step to encode the next slice line. If so, the encoding process of the current image is completed, and the next image can be encoded.

The embodiments of the present disclosure propose a decoding method that can be applied to a decoding end. The method may include the following first to sixth steps.

The first step is to divide the image horizontally and vertically into multiple rectangular slices.

The second step is to calculate the total resources (i.e., the target transmission bits number) and determine the number (ChunkNum) of chunks based on the total resources.

The third step is to receive the code stream, and for SliceNumX slices in each slice line, to sequentially parse for ChunkNum times, each time parsing SliceNumX chunks and deinterleaving the SliceNumX chunks into their respective bitstream buffers of the SliceNumX slices.

For example, SliceNumX represents the number of slices in the horizontal direction in the image.

For example, since there are ChunkNum chunks in each slice, each time a chunk of a slice is parsed, it is parsed for ChunkNum times to obtain all the chunks of the slice.

For example, ChunkNum chunks of the slice include at least two sizes of chunks.

The fourth step is to decode each slice based on the bitstream buffer of each slice.

In an embodiment, when chunks exist in the bitstream buffers corresponding to the SliceNumX slices, decoding of the chunks corresponding to the SliceNumX slices starts. Where the chunks existing in the bitstream buffer corresponding to the SliceNumX slices can include but is not limited to: for each of the slices, T chunks of the slice exist in the bitstream buffer corresponding to the slice, where T is greater than or equal to 1, and T is less than the number of the chunks.

The fifth step is, after each slice is decoded, to obtain the reconstructed image of each slice.

The sixth step is to determine whether the parsing of code streams of all slice lines is completed. If not, it is returned to the third step to parse the next slice line. If so, the decoding process of the current image is completed, and the next image can be parsed.

In an embodiment, for the encoding end, the bitstream buffer of each slice can be divided into chunks, and the chunks of all slices within a slice line can be interleaved together. For the encoding end and the decoding end, the number of chunks within each slice is the same, which ensures parallel decoding. The size of a chunk can be flexible. For example, the size of the first ChunkNum-1 chunks is the configured chunk size value, such as 8192, and the size of the last chunk is the number of remaining bits. For the encoding end, zero padding and byte alignment can be performed to each slice to ensure that the size of chunks of each slice is consistent.

For example, a slice line contains 2 slices, i.e., SliceNumX equals 2, as shown in FIG. 3A, the bitstream buffer (also known as the code stream buffer) for slice 1 can be divided into ChunkNum chunks, and the bitstream buffer for slice 2 can be divided into ChunkNum chunks.

For example, a slice line containing 3 slices, i.e., SliceNumX equals 3, as shown in FIG. 3B, the bitstream buffer for slice 1 can be divided into ChunkNum chunks, the bitstream buffer for slice 2 can be divided into ChunkNum chunks, and the bitstream buffer for slice 3 can be divided into ChunkNum chunks.

Embodiment 3

The length of the real encoded bits number of each slice is fixed. For example, the length of the real encoded bits number of each slice is equal to the target transmission bits number. The length of each of the first ChunkNum-1 chunks is fixed and denoted as the first size, and the length of the last chunk is not fixed and denoted as the second size.

In embodiment 3, for the encoding end, the following steps can be taken to implement the encoding method.

The first step is to divide the image horizontally and vertically into SliceNumX*SliceNumY rectangular slices.

The second step is to calculate the total resources (i.e., the target transmission bits number, can be denoted as total_resource) and determine the number (ChunkNum) of chunks based on the total resources. Details can be referred to the relevant introduction of the decoding end in the following embodiments, which will not be elaborated here.

The third step is to encode SliceNumX slices within each slice line in sequence, to generate SliceNumX bitstream buffers, and perform zero padding and byte alignment on the bitstream buffers.

For example, since each slice line contains SliceNumX slices, SliceNumX slices can be encoded to obtain SliceNumX bitstream buffers corresponding to the SliceNumX slices. For each bitstream buffer, zero padding and byte alignment can be performed on the bitstream buffer to ensure that the length of the bitstream buffer is equal to the target transmission bits number, that is, zero padding and byte alignment is performed on the bitstream buffer according to the target transmission bits number.

The fourth step is to divide each bitstream buffer into ChunkNum chunks.

For example, the calculation of the lengths of ChunkNum chunks can refer to the relevant introduction for the decoding end in the following embodiments, and will not be repeated here.

The fifth step is, for SliceNumX slices within a slice line, to encode for ChunkNum times in sequence, each time interleaving a chunk of each of SliceNumX slices to form a code stream.

In an embodiment, after chunks corresponding to all slices within a slice line have been obtained, the interleaving of the chunks corresponding to all SliceNumX slices begins to obtain the code stream. Where the chunks corresponding to all slices within a slice line have been obtained, including: for each slice, S chunks corresponding to the slice have been obtained, where S is greater than or equal to 1 and S is less than the number of chunks.

The sixth step is to determine whether all slice lines have been encoded; and if not, return to the third step to encode the next slice line.

For example, the schematic diagram of interleaving of the chunks when SliceNumX is equal to 2 can be seen in FIG. 4A. Taking ChunkNum chunks as N chunks as an example, chunk 1 of the first slice can be encoded first, then chunk 1 of the second slice is encoded, then chunk 2 of the first slice is encoded, then chunk 2 of the second slice is encoded, and so on, until chunk N of the first slice is encoded, and then chunk N of the second slice is encoded. As shown in FIG. 4B, the length of each of chunks 1 to (N−1) is size 1, and the length of chunk N is size 2.

Figures 4C, 4D, 5A, 5B, 5C, 6A:
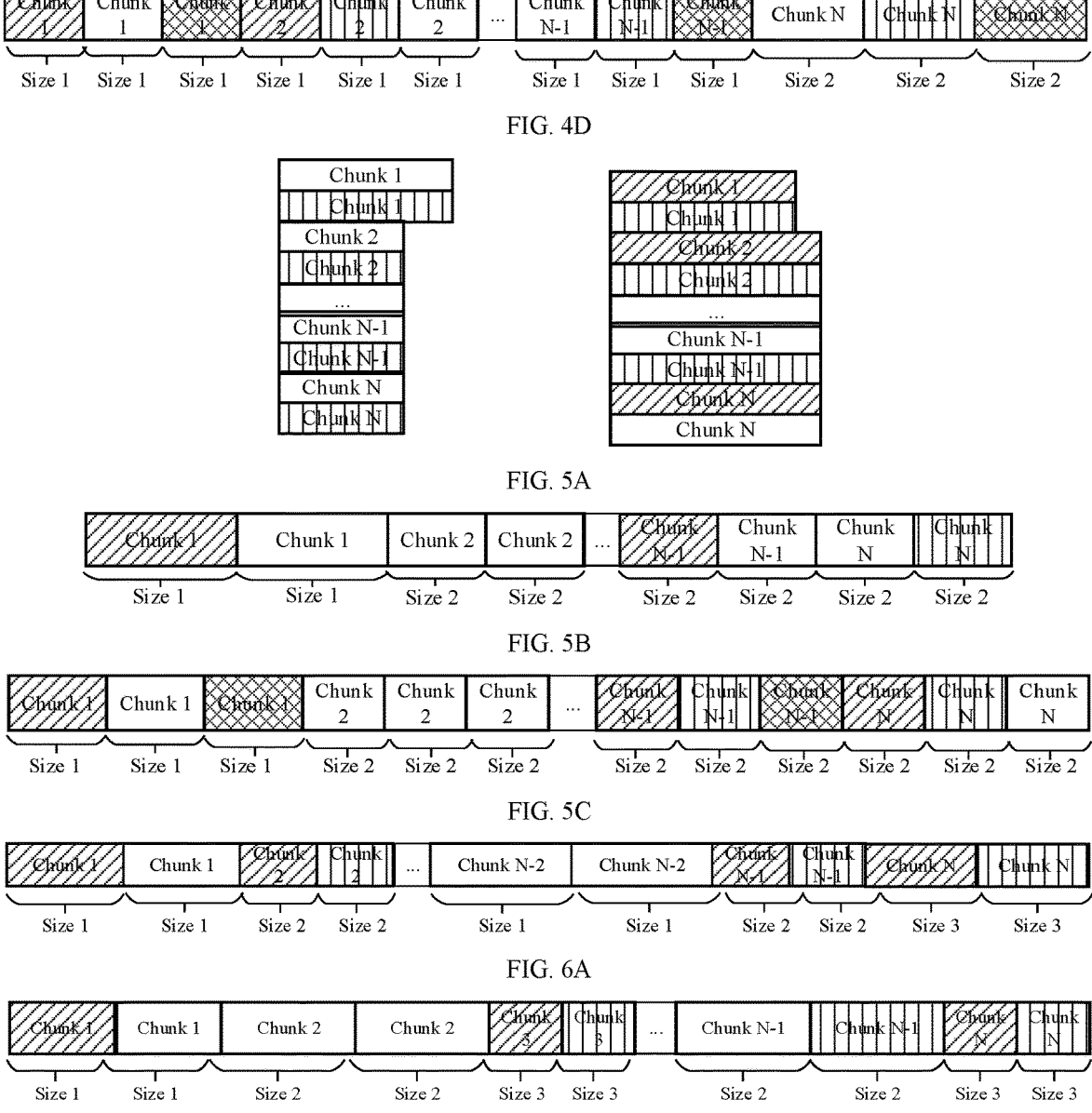

The schematic diagram of interleaving of the chunks when SliceNumX is equal to 3 can be seen in FIG. 4C. Taking ChunkNum chunks as N chunks as an example, chunk 1 of the first slice can be encoded first, then chunk 1 of the second slice is encoded, then chunk 1 of the third slice is encoded, then chunk 2 of the first slice is encoded, then chunk 2 of the second slice is encoded, then chunk 2 of the third slice is encoded, and so on, until chunk N of the first slice is encoded, then chunk N of the second slice is encoded, and then chunk N of the third slice is encoded. As shown in FIG. 4D, the length of each of chunks 1 to (N−1) is size 1, and the length of chunk N is size 2.

In embodiment 3, for the decoding end, the following steps can be taken to implement the decoding method.

The first step is to divide the image horizontally and vertically into SliceNumX*SliceNumY rectangular slices.

The second step is to calculate the total resources (total_resource) (i.e., the target transmission bits number) and determine the number (ChunkNum) of chunks based on the total resources.

In an embodiment, the total resources can be calculated using the following formula:

$$total\_resource = ((slice\_width * slice\_height * target\_bpp + 7) >> 3) << 3;$$

or $$total\_resource =$$
$$((slice\_width * slice\_height * target\_bpp + 7 + RC\_BUFFER\_LENGTH) >>$$
$$3) << 3.$$

In the above formula, RC_BUFFER_LENGTH represents the length of the stream that the bitstream buffers additionally buffer. Therefore, slice_width, slice_height, target_bpp, and RC-BUFFER_LENGTH are all known values, and thus, the total resources can be calculated.

In an embodiment, based on the total resources (total_resource), the number ChunkNum of chunks can be calculated using the following formula:

$$ChunkNum = total\_resource >> s + n.$$

In the above formula, the chunk size value s can be a preset value configured based on experience or a value indicated by syntax parameters (such as image level syntax parameters, or sequence level syntax parameters, etc.), which is not limited. In some embodiments, $2^s$ can be the length of the chunk. In the above formula, the value of n can be taken as follows:

$$n = total\_resource \% (1 << s) == 0 ? 0 : 1,$$

That is, if the value of total_resource % (1<<s) is 0, the value of n can be 0; and if the value of total_resource % (1<<s) is not 0, the value of n can be 1.

The third step is to receive the code stream, and for SliceNumX slices in each slice line, to sequentially parse for ChunkNum times, each time parsing SliceNumX chunks and deinterleaving the SliceNumX chunks into their respective bitstream buffers of the SliceNumX slices.

For example, for each slice, it is parsed for ChunkNum times to obtain ChunkNum chunks. The lengths of Chunk-Num chunks can be calculated as follows: the length of each of the first (ChunkNum-1) chunks is size 1, and the length of the last chunk is size 2. Where size 1 can be determined based on the chunk size value, and size 2 can be determined based on the total resources, the number of chunks, and the chunk size value. For example, $$size\ 1 = 1 << s,$$

$$size\ 2 = total\_source - ((ChunkNum - 1) << s).$$

The fourth step is to decode each slice based on the bitstream buffer of each slice.

In an embodiment, when chunks exist in the bitstream buffers corresponding to the SliceNumX slices, decoding of the chunks corresponding to the SliceNumX slices starts. Where the chunks existing in the bitstream buffer corresponding to the SliceNumX slices can include but is not limited to: for each of the slices, T chunks of the slice exist in the bitstream buffer corresponding to the slice, where T is greater than or equal to 1, and T is less than the number of the chunks.

The fifth step is, after each slice is decoded, to obtain the reconstructed image of each slice.

The sixth step is to determine whether the parsing of code streams of all slice lines is completed. If not, it is returned to the third step to parse the next slice line. If so, the decoding process of the current image is completed, and the next image can be parsed.

Embodiment 4

The length of the real encoded bits number of each slice is fixed. For example, the length of the real encoded bits number of each slice is equal to the target transmission bits number. The length of each of the last ChunkNum-1 chunks is fixed and denoted as the first size, and the length of the first chunk is not fixed and denoted as the second size.

In embodiment 4, for the encoding end, the following steps can be taken to implement the encoding method.

The first step is to divide the image horizontally and vertically into SliceNumX*SliceNumY rectangular slices.

The second step is to calculate the total resources (total_resource) (i.e., the target transmission bits number) and determine the number (ChunkNum) of chunks based on the total resources. Details can be referred to the relevant introduction of the decoding end in the following embodiments, which will not be elaborated here.

The third step is to encode SliceNumX slices within each slice line in sequence, to generate SliceNumX bitstream buffers, and perform zero padding and byte alignment on the bitstream buffers.

For example, since each slice line contains SliceNumX slices, SliceNumX slices can be encoded to obtain SliceNumX bitstream buffers corresponding to the SliceNumX slices. For each bitstream buffer, zero padding and byte alignment can be performed on the bitstream buffer to ensure that the length of the bitstream buffer is equal to the target transmission bits number, that is, zero padding and byte alignment is performed on the bitstream buffer according to the target transmission bits number.

The fourth step is to divide each bitstream buffer into ChunkNum chunks.

For example, the calculation of the lengths of ChunkNum chunks can refer to the relevant introduction for the decoding end in the following embodiments, and will not be repeated here.

The fifth step is, for SliceNumX slices within a slice line, to encode for ChunkNum times in sequence, each time interleaving a chunk of each of SliceNumX slices to form a code stream.

In an embodiment, after chunks corresponding to all slices within a slice line have been obtained, the interleaving of the chunks corresponding to all SliceNumX slices begins to obtain the code stream. Where the chunks corresponding to all slices within a slice line have been obtained, including: for each slice, S chunks corresponding to the slice have been obtained, where S is greater than or equal to 1 and S is less than the number of chunks.

The sixth step is to determine whether all slice lines have been encoded; and if not, return to the third step to encode the next slice line.

For example, the schematic diagram of interleaving of the chunks when SliceNumX is equal to 2 can be seen in FIG. 5A. Taking ChunkNum chunks as N chunks as an example, chunk 1 of the first slice can be encoded first, then chunk 1 of the second slice is encoded, then chunk 2 of the first slice is encoded, then chunk 2 of the second slice is encoded, and so on, until chunk N of the first slice is encoded, and then chunk N of the second slice is encoded. As shown in FIG. 5B, the length of chunk 1 is size 1, and the length of each of chunks 2 to N is size 2.

For example, the process for interleaving the chunks when SliceNumX is equal to 3 can include: first encoding chunk 1 of the first slice, then encoding chunk 1 of the second slice, then encoding chunk 1 of the third slice, then encoding chunk 2 of the first slice, encoding chunk 2 of the second slice, encoding chunk 2 of the third slice, and so on, until encoding chunk N of the first slice, encoding chunk N of the second slice, and encoding chunk N of the third slice. As shown in FIG. 5C, the length of chunk 1 is size 1, and the length of each of chunks 2 to N is size 2.

In embodiment 4, for the decoding end, the following steps can be taken to implement the decoding method.

The first step is to divide the image horizontally and vertically into SliceNumX*SliceNumY rectangular slices.

The second step is to calculate the total resources (total_resource) (i.e., the target transmission bits number) and determine the number (ChunkNum) of chunks based on the total resources.

In an embodiment, the total resources can be calculated using the following formula:

$$total\_resource = ((slice\_width * slice\_height * target\_bpp + 7) >> 3) << 3;$$

or

-continued total_resource =

$$((\text{slice\_width} * \text{slice\_height} * \text{target\_bpp} + 7 + \text{RC\_BUFFER\_LENGTH}) >> 3) << 3.$$

In an embodiment, based on the total resources (total_resource), the number ChunkNum of chunks can be calculated using the following formula:

$$ChunkNum = \text{total\_resource} >> s + n.$$

In the above formula, the chunk size value s can be a preset value configured based on experience or a value indicated by syntax parameters. The value of n can be taken as follows:

$$n = \text{total\_resource} \% (1 << s) == 0 ? 0 : 1,$$

The third step is to receive the code stream, and for SliceNumX slices in each slice line, to sequentially parse for ChunkNum times, each time parsing SliceNumX chunks and deinterleaving the SliceNumX chunks into their respective bitstream buffers of the SliceNumX slices.

For example, for each slice, it is parsed for ChunkNum times to obtain ChunkNum chunks. The lengths of ChunkNum chunks can be calculated as follows: the length of the first chunk is size 1, and the length of each of the last (ChunkNum-1) chunks is size 2. Where size 2 can be determined based on the chunk size value, and size 1 can be determined based on the total resources, the number of chunks, and the chunk size value. For example, $$\text{size } 2 = 1 << s,$$

$$\text{size } 1 = \text{total\_source} - ((ChunkNum - 1) << s).$$

The fourth step is to decode each slice based on the bitstream buffer of each slice.

In an embodiment, when chunks exist in the bitstream buffers corresponding to the SliceNumX slices, decoding of the chunks corresponding to the SliceNumX slices starts. Where the chunks existing in the bitstream buffer corresponding to the SliceNumX slices can include but is not limited to: for each of the slices, T chunks of the slice exist in the bitstream buffer corresponding to the slice, where T is greater than or equal to 1, and T is less than the number of the chunks.

The fifth step is, after each slice is decoded, to obtain the reconstructed image of each slice.

The sixth step is to determine whether the parsing of code streams of all slice lines is completed. If not, it is returned to the third step to parse the next slice line. If so, the decoding process of the current image is completed, and the next image can be parsed.

Embodiment 5

The length of the real encoded bits number of each slice is fixed. For example, the length of the real encoded bits number of each slice is equal to the target transmission bits number. The length of each of the remaining (ChunkNum-1) chunks except the k-th chunk is fixed and denoted as the first size, and the length of the k-th chunk is not fixed and denoted as the second size. The k-th chunk can be the last chunk of all chunks, the first chunk of all chunks, or any one chunk between the first and last chunks in all chunks.

In embodiment 5, for the encoding end, the following steps can be taken to implement the encoding method.

The first step is to divide the image horizontally and vertically into SliceNumX*SliceNumY rectangular slices.

The second step is to calculate the total resources (total_resource) (i.e., the target transmission bits number) and determine the number (ChunkNum) of chunks based on the total resources. Details can be referred to the relevant introduction of the decoding end in the following embodiments, which will not be elaborated here.

The third step is to encode SliceNumX slices within each slice line in sequence, to generate SliceNumX bitstream buffers, and perform zero padding and byte alignment on the bitstream buffers.

For example, since each slice line contains SliceNumX slices, SliceNumX slices can be encoded to obtain SliceNumX bitstream buffers corresponding to the SliceNumX slices. For each bitstream buffer, zero padding and byte alignment can be performed on the bitstream buffer to ensure that the length of the bitstream buffer is equal to the target transmission bits number, that is, zero padding and byte alignment is performed on the bitstream buffer according to the target transmission bits number.

The fourth step is to divide each bitstream buffer into ChunkNum chunks.

For example, the calculation of the lengths of ChunkNum chunks can refer to the relevant introduction for the decoding end in the following embodiments, and will not be repeated here.

The fifth step is, for SliceNumX slices within a slice line, to encode for ChunkNum times in sequence, each time interleaving a chunk of each of SliceNumX slices to form a code stream.

In an embodiment, after chunks corresponding to all slices within a slice line have been obtained, the interleaving of the chunks corresponding to all SliceNumX slices begins to obtain the code stream. Where the chunks corresponding to all slices within a slice line have been obtained, including: for each slice, S chunks corresponding to the slice have been obtained, where S is greater than or equal to 1 and S is less than the number of chunks.

The sixth step is to determine whether all slice lines have been encoded; and if not, return to the third step to encode the next slice line.

In embodiment 5, for the decoding end, the following steps can be taken to implement the decoding method.

The first step is to divide the image horizontally and vertically into SliceNumX*SliceNumY rectangular slices.

The second step is to calculate the total resources (total_resource) (i.e., the target transmission bits number) and determine the number (ChunkNum) of chunks based on the total resources.

For example, the total resources can be calculated using the following formula:

total_resource =

$$((\text{slice\_width} * \text{slice\_height} * \text{target\_bpp} + 7) >> 3) << 3; \text{ or}$$

-continued total resource =

$((slice\_width * slice\_height * target\_bpp + 7 + RC\_BUFFER\_LENGTH) >> 3) << 3.$ Based on the total resources (total_resource), the number ChunkNum of chunks can be calculated using the following formula:

$$ChunkNum = total\_resource >> s + n.$$

Where the chunk size value s is a preset value, and the value of n can be calculated by the following formula:

$$n = total\_resource \ \%(1 << s) == 0?0:1.$$

The third step is to receive the code stream, and for SliceNumX slices in each slice line, to sequentially parse for ChunkNum times, each time parsing SliceNumX chunks and deinterleaving the SliceNumX chunks into their respective bitstream buffers of the SliceNumX slices.

For example, for each slice, it is parsed for ChunkNum times to obtain ChunkNum chunks. The lengths of Chunk-Num chunks can be calculated as follows: the length of the k-th chunk is size 1, and the length of each of the remaining (ChunkNum-1) chunks is size 2. The range of the value of k is one of 1 to ChunkNum. Where size 2 can be determined based on the chunk size value, and size 1 can be determined based on the total resources, the number of chunks, and the chunk size value. For example, $$size \ 2 = 1 << s,$$

$$size \ 1 = total\_source - ((ChunkNum - 1) << s).$$

The fourth step is to decode each slice based on the bitstream buffer of each slice.

In an embodiment, when chunks exist in the bitstream buffers corresponding to the SliceNumX slices, decoding of the chunks corresponding to the SliceNumX slices starts. Where the chunks existing in the bitstream buffer corresponding to the SliceNumX slices can include but is not limited to: for each of the slices, T chunks of the slice exist in the bitstream buffer corresponding to the slice, where T is greater than or equal to 1, and T is less than the number of the chunks.

The fifth step is, after each slice is decoded, to obtain the reconstructed image of each slice.

The sixth step is to determine whether the parsing of code streams of all slice lines is completed. If not, it is returned to the third step to parse the next slice line. If so, the decoding process of the current image is completed and the next image can be parsed.

Embodiment 6

The length of the real encoded bits number of each slice is fixed. For example, the length of the real encoded bits number of each slice is equal to the target transmission bits number. The length of each of the remaining (ChunkNum-1)

chunks except the k-th chunk is fixed and denoted as the first size, and the length of the k-th chunk is not fixed and denoted as the second size. The k-th chunk can be the last chunk of all chunks, the first chunk of all chunks, or any one chunk between the first and last chunks in all chunks.

In embodiment 6, for the encoding end, the following steps can be taken to implement the encoding method.

The first step is to divide the image horizontally and vertically into SliceNumX*SliceNumY rectangular slices.

The second step is to calculate the total resources (total_resource) (i.e., the target transmission bits number) and determine the number (ChunkNum) of chunks based on the slice height (slice_height) of a slice. Details can be referred to the relevant introduction of the decoding end in the following embodiments, which will not be elaborated here.

The third step is to encode SliceNumX slices within each slice line in sequence, to generate SliceNumX bitstream buffers, and perform zero padding and byte alignment on the bitstream buffers.

For example, since each slice line contains SliceNumX slices, SliceNumX slices can be encoded to obtain Sli-ceNumX bitstream buffers corresponding to the SliceNumX slices. For each bitstream buffer, zero padding and byte alignment can be performed on the bitstream buffer to ensure that the length of the bitstream buffer is equal to the target transmission bits number, that is, zero padding and byte alignment is performed on the bitstream buffer according to the target transmission bits number.

The fourth step is to divide each bitstream buffer into ChunkNum chunks.

For example, the calculation of the lengths of ChunkNum chunks can refer to the relevant introduction for the decoding end in the following embodiments, and will not be repeated here.

The fifth step is, for SliceNumX slices within a slice line, to encode for ChunkNum times in sequence, each time interleaving a chunk of each of SliceNumX slices to form a code stream.

In an embodiment, after chunks corresponding to all slices within a slice line have been obtained, the interleaving of the chunks corresponding to all SliceNumX slices begins to obtain the code stream. Where the chunks corresponding to all slices within a slice line have been obtained, including: for each slice, S chunks corresponding to the slice have been obtained, where S is greater than or equal to 1 and S is less than the number of chunks.

The sixth step is to determine whether all slice lines have been encoded; and if not, return to the third step to encode the next slice line.

In embodiment 6, for the decoding end, the following steps can be taken to implement the decoding method.

The first step is to divide the image horizontally and vertically into SliceNumX*SliceNumY rectangular slices.

The second step is to calculate the total resources (total_resource) (i.e., the target transmission bits number) and determine the number (ChunkNum) of chunks based on the slice height (slice_height) of a slice.

For example, the total resources can be calculated using the following formula:

total_resource =

$((slice\_width * slice\_height * target\_bpp + 7) >> 3) << 3;$ or

-continued total_resource =

$$((slice\_width * slice\_height * target\_bpp + 7 + RC\_BUFFER\_LENGTH) >> 3) << 3.$$

Based on the slice height (slice_height), the number ChunkNum of chunks can be calculated using the following formula:

$$ChunkNum = slice\_height.$$

The third step is to receive the code stream, and for SliceNumX slices in each slice line, to sequentially parse for ChunkNum times, each time parsing SliceNumX chunks and deinterleaving the SliceNumX chunks into their respective bitstream buffers of the SliceNumX slices.

For example, for each slice, it is parsed for ChunkNum times to obtain ChunkNum chunks. The lengths of Chunk-Num chunks can be calculated as follows: the length of the k-th chunk is size 1, and the length of each of the remaining (ChunkNum-1) chunks is size 2. The range of the value of k is 1 to ChunkNum. Where size 2 can be determined based on the slice width and the bit per pixel, and size 1 can be determined based on the total resources, the number of chunks, and size 2. For example, $$size\ 2 = ((slice\_width * bpp + 7) << 3) >> 3,$$

$$size\ 1 = total\_resource - ((ChunkNum - 1) * size\ 2).$$

The fourth step is to decode each slice based on the bitstream buffer of each slice.

In an embodiment, when chunks exist in the bitstream buffers corresponding to the SliceNumX slices, decoding of the chunks corresponding to the SliceNumX slices starts. Where the chunks existing in the bitstream buffer corresponding to the SliceNumX slices can include but is not limited to: for each of the slices, T chunks of the slice exist in the bitstream buffer corresponding to the slice, where T is greater than or equal to 1, and T is less than the number of the chunks.

The fifth step is, after each slice is decoded, to obtain the reconstructed image of each slice.

The sixth step is to determine whether the parsing of code streams of all slice lines is completed. If not, it is returned to the third step to parse the next slice line. If so, the decoding process of the current image is completed and the next image can be parsed.

Embodiment 7

The length of the real encoded bits number of each slice is fixed. For example, the length of the real encoded bits number of each slice is equal to the target transmission bits number. The lengths of the first (ChunkNum-1) chunks are switched between two fixed values based on the odd numbered chunks and the even numbered chunks. The length of the odd numbered chunk is the first size, the length of the even numbered chunk is the second size, and the length of the last chunk is not fixed and is referred to as the third size.

In embodiment 7, for the encoding end, the following steps can be taken to implement the encoding method.

The first step is to divide the image horizontally and vertically into SliceNumX*SliceNumY rectangular slices.

The second step is to calculate the total resources (total_resource) (i.e., the target transmission bits number) and determine the number (ChunkNum) of chunks based on the total resources. Details can be referred to the relevant introduction of the decoding end in the following embodiments, which will not be elaborated here.

The third step is to encode SliceNumX slices within each slice line in sequence, to generate SliceNumX bitstream buffers, and perform zero padding and byte alignment on the bitstream buffers.

For example, since each slice line contains SliceNumX slices, SliceNumX slices can be encoded to obtain SliceNumX bitstream buffers corresponding to the SliceNumX slices. For each bitstream buffer, zero padding and byte alignment can be performed on the bitstream buffer to ensure that the length of the bitstream buffer is equal to the target transmission bits number, that is, zero padding and byte alignment is performed on the bitstream buffer according to the target transmission bits number.

The fourth step is to divide each bitstream buffer into ChunkNum chunks.

For example, the calculation of the lengths of ChunkNum chunks can refer to the relevant introduction for the decoding end in the following embodiments, and will not be repeated here.

The fifth step is, for SliceNumX slices within a slice line, to encode for ChunkNum times in sequence, each time interleaving a chunk of each of SliceNumX slices to form a code stream.

In an embodiment, after chunks corresponding to all slices within a slice line have been obtained, the interleaving of the chunks corresponding to all SliceNumX slices begins to obtain the code stream. Where the chunks corresponding to all slices within a slice line have been obtained, including: for each slice, S chunks corresponding to the slice have been obtained, where S is greater than or equal to 1 and S is less than the number of chunks.

The sixth step is to determine whether all slice lines have been encoded; and if not, return to the third step to encode the next slice line.

For example, the process of interleaving the chunks when SliceNumX is equal to 2 can include: encoding chunk 1 of the first slice first, then encoding chunk 1 of the second slice, then encoding chunk 2 of the first slice, then encoding chunk 2 of the second slice, and so on, until encoding chunk N of the first slice, and then encoding chunk N of the second slice. As shown in FIG. 6A, the length of each of odd numbered chunks such as chunk 1, chunk 3, and chunk 5 in respective slices is size 1, the length of each of even numbered chunks such as chunk 2, chunk 4, and chunk 6 in respective slices is size 2, and the length of the last chunk (i.e., chunk N) is size 3.

In embodiment 7, for the decoding end, the following steps can be taken to implement the decoding method.

The first step is to divide the image horizontally and vertically into SliceNumX*SliceNumY rectangular slices.

The second step is to calculate the total resources (total_resource) (i.e., the target transmission bits number) and determine the number (ChunkNum) of chunks based on the total resources.

For example, the total resources can be calculated using the following formula:

$$total\_resource =$$

$$((slice\_width * slice\_height * target\_bpp + 7) >> 3) << 3; or$$

$$total\_resource =$$

$$((slice\_width * slice\_height * target\_bpp + 7 + RC\_BUFFER\_LENGTH) >> 3) << 3.$$

Based on the total resources (total_resource), the number ChunkNum of chunks can be calculated using the following formula:

$$ChunkNum = (total\_resource >> s) << 1 + n.$$

Where the chunk size value s is a preset value, and the value of n can be calculated by the following formula:

$$n = total\_resource \ \%(1 << s) == 0\,?\,0{:}1.$$

The third step is to receive the code stream, and for SliceNumX slices in each slice line, to sequentially parse for ChunkNum times, each time parsing SliceNumX chunks and deinterleaving the SliceNumX chunks into their respective bitstream buffers of the SliceNumX slices.

For example, for each slice, it is parsed for ChunkNum times to obtain ChunkNum chunks. The lengths of Chunk-Num chunks can be calculated as follows: the lengths of the first (ChunkNum-1) chunks can be switched between two fixed values, size 1 and size 2 in sequence. For example, the length of each of the odd numbered chunks is size 1, and the length of each of the even numbered chunks is size 2; or the length of each of the odd numbered chunks is size 2, and the length of each of the even numbered chunks is size 1. In addition, the length of the last chunk is size 3. Where both size 1 and size 2 can be determined based on the chunk size value, and size 3 can be determined based on the total resources, the chunk size value, and the number of chunks. For example, $$size\ 1 = (1 << s) + x,$$

$$size\ 2 = (1 << s) - x, and$$

$$size\ 3 = total\_source - ((ChunkNum - 1) << s).$$

In the above formula, x is a preset value that can be configured based on experience, such as 1, 2, 3 or −1, −2, −3, etc., or indicated by image level syntax parameters.

The fourth step is to decode each slice based on the bitstream buffer of each slice.

In an embodiment, when chunks exist in the bitstream buffers corresponding to the SliceNumX slices, decoding of the chunks corresponding to the SliceNumX slices starts. Where the chunks existing in the bitstream buffer corresponding to the SliceNumX slices can include but is not limited to: for each of the slices, T chunks of the slice exist in the bitstream buffer corresponding to the slice, where T is greater than or equal to 1, and T is less than the number of the chunks.

The fifth step is, after each slice is decoded, to obtain the reconstructed image of each slice.

The sixth step is to determine whether the parsing of code streams of all slice lines is completed. If not, it is returned to the third step to parse the next slice line. If so, the decoding process of the current image is completed and the next image can be parsed.

Embodiment 8

The length of the real encoded bits number of each slice is fixed. For example, the length of the real encoded bits number of each slice is equal to the target transmission bits number. The lengths of the last (ChunkNum-1) chunks are switched between two fixed values based on the odd numbered chunks and the even numbered chunks. For example, the length of the odd numbered chunk is the first size, the length of the even numbered chunk is the second size, and the length of the first chunk is not fixed and is referred to as the third size.

In embodiment 8, for the encoding end, the following steps can be taken to implement the encoding method.

The first step is to divide the image horizontally and vertically into SliceNumX*SliceNumY rectangular slices.

The second step is to calculate the total resources (total_resource) (i.e., the target transmission bits number) and determine the number (ChunkNum) of chunks based on the total resources. Details can be referred to the relevant introduction of the decoding end in the following embodiments, which will not be elaborated here.

The third step is to encode SliceNumX slices within each slice line in sequence, to generate SliceNumX bitstream buffers, and perform zero padding and byte alignment on the bitstream buffers.

For example, since each slice line contains SliceNumX slices, SliceNumX slices can be encoded to obtain SliceNumX bitstream buffers corresponding to the SliceNumX slices. For each bitstream buffer, zero padding and byte alignment can be performed on the bitstream buffer to ensure that the length of the bitstream buffer is equal to the target transmission bits number, that is, zero padding and byte alignment is performed on the bitstream buffer according to the target transmission bits number.

The fourth step is to divide each bitstream buffer into ChunkNum chunks.

For example, the calculation of the lengths of ChunkNum chunks can refer to the relevant introduction for the decoding end in the following embodiments, and will not be repeated here.

The fifth step is, for SliceNumX slices within a slice line, to encode for ChunkNum times in sequence, each time interleaving a chunk of each of SliceNumX slices to form a code stream.

In an embodiment, after chunks corresponding to all slices within a slice line have been obtained, the interleaving of the chunks corresponding to all SliceNumX slices begins to obtain the code stream. Where the chunks corresponding to all slices within a slice line have been obtained, including: for each slice, S chunks corresponding to the slice have been obtained, where S is greater than or equal to 1 and S is less than the number of chunks.

The sixth step is to determine whether all slice lines have been encoded; and if not, return to the third step to encode the next slice line.

For example, the process of interleaving the chunks when SliceNumX is equal to 2 can include: encoding chunk 1 of the first slice first, then encoding chunk 1 of the second slice, then encoding chunk 2 of the first slice, then encoding chunk 2 of the second slice, and so on, until encoding chunk N of the first slice, and then encoding chunk N of the second slice. As shown in FIG. 6B, the length of the first chunk (i.e., chunk 1) of each slice is size 1. In the remaining chunks, the length of each of even numbered chunks such as chunk 2, chunk 4, and chunk 6 of respective slices is size 2, and the length of each of odd numbered chunks such as chunk 3, chunk 5, and chunk 7 of respective slices is size 3.

In embodiment 8, for the decoding end, the following steps can be taken to implement the decoding method.

The first step is to divide the image horizontally and vertically into SliceNumX*SliceNumY rectangular slices.

The second step is to calculate the total resources (total_resource) (i.e., the target transmission bits number) and determine the number (ChunkNum) of chunks based on the total resources.

For example, the total resources can be calculated using the following formula:

$$total\_resource =$$

$$((slice\_width * slice\_height * target\_bpp + 7) >> 3) << 3; \text{ or}$$

$$total\_resource =$$

$$((slice\_width * slice\_height * target\_bpp + 7 + RC\_BUFFER\_LENGTH) >>$$

$$3) << 3.$$

Based on the total resources (total_resource), the number ChunkNum of chunks can be calculated using the following formula:

$$ChunkNum = (total\_resource >> s) << 1 + n.$$

Where the chunk size value s is a preset value, and the value of n can be calculated by the following formula:

$$n = total\_resource \text{ \% } (1 << s) == 0 \text{ ? } 0:1.$$

The third step is to receive the code stream, and for SliceNumX slices in each slice line, to sequentially parse for ChunkNum times, each time parsing SliceNumX chunks and deinterleaving the SliceNumX chunks into their respective bitstream buffers of the SliceNumX slices.

For example, for each slice, it is parsed for ChunkNum times to obtain ChunkNum chunks. The lengths of ChunkNum chunks can be calculated as follows: the length of the first chunk is size 1, and the lengths of the last (ChunkNum-1) chunks are switched between two fixed values, size 2 and size 3. For example, the length of the odd numbered chunk is size 2, and the length of the even numbered chunk is size 3; or the length of the odd numbered chunk is size 3, and the length of the even numbered chunk is size 2. Among them, both size 2 and size 3 can be determined based on chunk size values, while size 1 can be determined based on total resources, chunk size values, and the number of chunks. For example, $$size\ 2 = (1 << s) + x,$$

$$size\ 2 = (1 << s) - x, \text{ and}$$

$$size\ 3 = total\_source - ((ChunkNum - 1) << s),$$

Where x is a preset value.

The fourth step is to decode each slice based on the bitstream buffer of each slice.

In an embodiment, when chunks exist in the bitstream buffers corresponding to the SliceNumX slices, decoding of the chunks corresponding to the SliceNumX slices starts. Where the chunks existing in the bitstream buffer corresponding to the SliceNumX slices can include but is not limited to: for each of the slices, T chunks of the slice exist in the bitstream buffer corresponding to the slice, where T is greater than or equal to 1, and T is less than the number of the chunks.

The fifth step is, after each slice is decoded, to obtain the reconstructed image of each slice.

The sixth step is to determine whether the parsing of code streams of all slice lines is completed. If not, it is returned to the third step to parse the next slice line. If so, the decoding process of the current image is completed and the next image can be parsed.

Embodiment 9

The length of the real encoded bits number for each slice is fixed. For example, the length of the real encoded bits number for each slice is equal to the target transmission bits number. The lengths of the remaining ChunkNum-1 chunks except the k-th chunk are switched between two fixed values based on the odd numbered chunks and the even numbered chunks. For example, the length of each of the odd numbered chunks is the first size, the length of each of the even numbered chunks is the second size, and the length of the k-th chunk is not fixed and is referred to as the third size. The k-th chunk can be the last chunk of all chunks, the first chunk of all chunks, or any one chunk between the first and last chunks in all chunks.

In embodiment 9, for the encoding end, the following steps can be taken to implement the encoding method.

The first step is to divide the image horizontally and vertically into SliceNumX*SliceNumY rectangular slices.

The second step is to calculate the total resources (total_resource) (i.e., the target transmission bits number) and determine the number (ChunkNum) of chunks based on the total resources. Details can be referred to the relevant introduction of the decoding end in the following embodiments, which will not be elaborated here.

The third step is to encode SliceNumX slices within each slice line in sequence, to generate SliceNumX bitstream buffers, and perform zero padding and byte alignment on the bitstream buffers.

For example, since each slice line contains SliceNumX slices, SliceNumX slices can be encoded to obtain SliceNumX bitstream buffers corresponding to the SliceNumX slices. For each bitstream buffer, zero padding and byte alignment can be performed on the bitstream buffer to ensure that the length of the bitstream buffer is equal to the target transmission bits number, that is, zero padding and byte alignment is performed on the bitstream buffer according to the target transmission bits number.

The fourth step is to divide each bitstream buffer into ChunkNum chunks.

For example, the calculation of the lengths of ChunkNum chunks can refer to the relevant introduction for the decoding end in the following embodiments, and will not be repeated here.

The fifth step is, for SliceNumX slices within a slice line, to encode for ChunkNum times in sequence, each time interleaving a chunk of each of SliceNumX slices to form a code stream.

In an embodiment, when chunks corresponding to all slices within a slice line have been obtained, interleaving of chunks corresponding to all SliceNumX slices is started to obtain the code stream; where the chunks corresponding to all slices within a slice line have been obtained, including: for each slice, S chunks corresponding to the slice have been obtained, where S is greater than or equal to 1 and S is less than the number of chunks.

The sixth step is to determine whether all slice lines have been encoded; and if not, return to the third step to encode the next slice line.

In embodiment 9, for the decoding end, the following steps can be taken to implement the decoding method.

The first step is to divide the image horizontally and vertically into SliceNumX*SliceNumY rectangular slices.

The second step is to calculate the total resources (total_resource) (i.e., the target transmission bits number) and determine the number (ChunkNum) of chunks based on the total resources.

For example, the total resources can be calculated using the following formula:

$$\text{total\_resource} = ((\text{slice\_width} * \text{slice\_height} * \text{target\_bpp} + 7) \gg 3) \ll 3; \text{ or}$$

$$\text{total\_resource} =$$

$$((\text{slice\_width} * \text{slice\_height} * \text{target\_bpp} + 7 + \text{RC\_BUFFER\_LENGTH}) \gg 3) \ll 3.$$

Based on the total resources (total_resource), the number ChunkNum of chunks can be calculated using the following formula:

$$ChunkNum = (\text{total\_resource} \gg s) \ll 1 + n.$$

Where s is a preset value, and the value of n can be calculated by the following formula:

$$n = \text{total\_resource} \% (1 \ll s) == 0 ? 0 : 1.$$

The third step is to receive the code stream, and for SliceNumX slices in each slice line, to sequentially parse for ChunkNum times, each time parsing SliceNumX chunks and deinterleaving the SliceNumX chunks into their respective bitstream buffers of the SliceNumX slices.

For example, for each slice, it is parsed for ChunkNum times to obtain ChunkNum chunks. The lengths of ChunkNum chunks can be calculated as follows: the length of the k-th chunk is size 1, and the lengths of the remaining (ChunkNum-1) chunks except the k-th chunk are switched between two fixed values, size 2 and size 3. For example, the length of the odd numbered chunk is size 2, and the length of the even numbered chunk is size 3; or the length of the odd numbered chunk is size 3, and the length of the even numbered chunk is size 2. Among them, both size 2 and size 3 can be determined based on chunk size values, while size 1 can be determined based on total resources, chunk size values, and the number of chunks. For example, $$\text{size } 2 = (1 \ll s) + x,$$

$$\text{size } 2 = (1 \ll s) - x, \text{ and}$$

$$\text{size } 3 = \text{total\_source} - ((ChunkNum - 1) \ll s),$$

Where x is a preset value. The odd numbered chunks are odd numbered chunks in the remaining (ChunkNum-1) chunks, and the even numbered chunks are even numbered chunks in the remaining (ChunkNum-1) chunks.

The fourth step is to decode each slice based on the bitstream buffer of each slice.

In an embodiment, when chunks exist in the bitstream buffers corresponding to the SliceNumX slices, decoding of the chunks corresponding to the SliceNumX slices starts. Where the chunks existing in the bitstream buffer corresponding to the SliceNumX slices can include but is not limited to: for each of the slices, T chunks of the slice exist in the bitstream buffer corresponding to the slice, where T is greater than or equal to 1, and T is less than the number of the chunks.

The fifth step is, after each slice is decoded, to obtain the reconstructed image of each slice.

The sixth step is to determine whether the parsing of code streams of all slice lines is completed. If not, it is returned to the third step to parse the next slice line. If so, the decoding process of the current image is completed and the next image can be parsed.

Embodiment 10

The length of the real encoded bits number for each slice is fixed. For example, the length of the real encoded bits number for each slice is equal to the target transmission bits number. The lengths of the remaining ChunkNum-1 chunks except the k-th chunk are switched between two fixed values based on the odd numbered chunks and the even numbered chunks. For example, the length of each of the odd numbered chunks is the first size, the length of each of the even numbered chunks is the second size, and the length of the k-th chunk is not fixed and is referred to as the third size. The k-th chunk can be the last chunk of all chunks, the first chunk of all chunks, or any one chunk between the first and last chunks in all chunks.

In embodiment 10, for the encoding end, the following steps can be taken to implement the encoding method.

The first step is to divide the image horizontally and vertically into SliceNumX*SliceNumY rectangular slices.

The second step is to calculate the total resources (total_resource) (i.e., the target transmission bits number) and determine the number (ChunkNum) of chunks based on the slice height (slice_height) of a slice. Details can be referred to the relevant introduction of the decoding end in the following embodiments, which will not be elaborated here.

The third step is to encode SliceNumX slices within each slice line in sequence, to generate SliceNumX bitstream buffers, and perform zero padding and byte alignment on the bitstream buffers.

For example, since each slice line contains SliceNumX slices, SliceNumX slices can be encoded to obtain SliceNumX bitstream buffers corresponding to the SliceNumX slices. For each bitstream buffer, zero padding and byte alignment can be performed on the bitstream buffer to ensure that the length of the bitstream buffer is equal to the target transmission bits number, that is, zero padding and byte alignment is performed on the bitstream buffer according to the target transmission bits number.

The fourth step is to divide each bitstream buffer into ChunkNum chunks.

For example, the calculation of the lengths of ChunkNum chunks can refer to the relevant introduction for the decoding end in the following embodiments, and will not be repeated here.

The fifth step is, for SliceNumX slices within a slice line, to encode for ChunkNum times in sequence, each time interleaving a chunk of each of SliceNumX slices to form a code stream.

In an embodiment, when chunks corresponding to all slices within a slice line have been obtained, interleaving of chunks corresponding to all SliceNumX slices is started to obtain the code stream; where the chunks corresponding to all slices within a slice line have been obtained, including: for each slice, S chunks corresponding to the slice have been obtained, where S is greater than or equal to 1 and S is less than the number of chunks.

The sixth step is to determine whether all slice lines have been encoded; and if not, return to the third step to encode the next slice line.

In embodiment 10, for the decoding end, the following steps can be taken to implement the decoding method.

The first step is to divide the image horizontally and vertically into SliceNumX*SliceNumY rectangular slices.

The second step is to calculate the total resources (total_resource) (i.e., the target transmission bits number) and determine the number (ChunkNum) of chunks based on the slice height (slice_height) of a slice.

For example, the total resources can be calculated using the following formula:

$$total\_resource = ((slice\_width * slice\_height * target\_bpp + 7) \gg 3) \ll 3; \text{ or}$$

$$total\_resource =$$
$$((slice\_width * slice\_height * target\_bpp + 7 + RC\_BUFFER\_LENGTH) \gg$$
$$3) \ll 3.$$

Based on the slice height (slice_height), the number ChunkNum of chunks can be calculated using the following formula:

$$ChunkNum = slice\_height + 1.$$

The third step is to receive the code stream, and for SliceNumX slices in each slice line, to sequentially parse for ChunkNum times, each time parsing SliceNumX chunks and deinterleaving the SliceNumX chunks into their respective bitstream buffers of the SliceNumX slices.

For example, for each slice, it is parsed for ChunkNum times to obtain ChunkNum chunks. The lengths of ChunkNum chunks can be calculated as follows: the length of the k-th chunk is size 1, and the lengths of the remaining (ChunkNum-1) chunks except the k-th chunk are switched between two fixed values, size 2 and size 3. Where k ranges from 1 to ChunkNum. For example, the length of each of the odd numbered chunks is size 2, and the length of each of the even numbered chunks is size 3; or the length of the odd numbered chunks is size 3, and the length of each of the even numbered chunks is size 2. Where size 2 and size 3 can be determined based on the slice width and the bit per pixel, and size 1 can be determined based on the total resources, the number of chunks, and size 2. For example, $$size\ 2 = (((slice\_width * bpp) \ll 3) \gg 3) + x,$$

$$size\ 3 = (((slice\_width * bpp) \ll 3) \gg 3) - x, \text{ and}$$

$$size\ 1 = total\_resource - ((ChunkNum\_1) * (size\ 2 - x)),$$

Where x is a preset value. The odd numbered chunks are odd numbered chunks in the remaining (ChunkNum-1) chunks, and the even numbered chunks are even numbered chunks in the remaining (ChunkNum-1) chunks. In the above formula, (((slice_width*bpp)<<3)>>3) can be denoted as the number of pixels in a slice line, and determined based on the slice width and the bit per pixel.

The fourth step is to decode each slice based on the bitstream buffer of each slice.

In an embodiment, when chunks exist in the bitstream buffers corresponding to the SliceNumX slices, decoding of the chunks corresponding to the SliceNumX slices starts. Where the chunks existing in the bitstream buffer corresponding to the SliceNumX slices can include but is not limited to: for each of the slices, T chunks of the slice exist in the bitstream buffer corresponding to the slice, where T is greater than or equal to 1, and T is less than the number of the chunks.

The fifth step is, after each slice is decoded, to obtain the reconstructed image of each slice.

The sixth step is to determine whether the parsing of code streams of all slice lines is completed. If not, it is returned to the third step to parse the next slice line. If so, the decoding process of the current image is completed and the next image can be parsed.

Embodiment 11

The length of the real encoded bits number for each slice is fixed, and the length of the real encoded bits number for each slice is not the target transmission bits number, but is determined based on the lengths of all chunks, that is, the sum of the lengths of all chunks. By performing zero padding and byte alignment on the bitstream buffers, the lengths of all chunks are switched between two fixed values based on the odd numbered chunks and the even numbered chunks. For example, the length of each of the odd numbered chunks is the first size, the length of each of the even numbered chunks is the second size. The length of the bitstream buffer are the sum of the lengths of the first-size chunks plus the lengths of the second-size chunks.

In embodiment 11, for the encoding end, the following steps can be taken to implement the encoding method.

The first step is to divide the image horizontally and vertically into SliceNumX*SliceNumY rectangular slices.

The second step is to calculate the total resources (total_resource) (i.e., the target transmission bits number) and determine the number (ChunkNum) of chunks based on the total resources. Details can be referred to the relevant introduction of the decoding end in the following embodiments, which will not be elaborated here.

The third step is to encode SliceNumX slices within each slice line in sequence, to generate SliceNumX bitstream buffers, and perform zero padding and byte alignment on the bitstream buffers.

For example, since each slice line contains SliceNumX slices, SliceNumX slices can be encoded to obtain SliceNumX bitstream buffers corresponding to the SliceNumX slices. For each bitstream buffer, zero padding and byte alignment can be performed on the bitstream buffer so that the length of the real encoded bits number is the sum of the lengths of all chunks, and the sum of the lengths of all chunks can be greater than or equal to the target transmission bits number. In other words, zero padding and byte alignment can be performed on the bitstream buffer according to the length of all chunks.

The fourth step is to divide each bitstream buffer into ChunkNum chunks.

For example, the calculation of the lengths of ChunkNum chunks can refer to the relevant introduction for the decoding end in the following embodiments, and will not be repeated here.

The fifth step is, for SliceNumX slices within a slice line, to encode for ChunkNum times in sequence, each time interleaving a chunk of each of SliceNumX slices to form a code stream.

In an embodiment, when chunks corresponding to all slices within a slice line have been obtained, interleaving of chunks corresponding to all SliceNumX slices is started to obtain the code stream; where the chunks corresponding to all slices within a slice line have been obtained, including: for each slice, S chunks corresponding to the slice have been obtained, where S is greater than or equal to 1 and S is less than the number of chunks.

The sixth step is to determine whether all slice lines have been encoded; and if not, return to the third step to encode the next slice line.

For example, the process of interleaving the chunks when SliceNumX is equal to 2 can include: encoding chunk 1 of the first slice first, then encoding chunk 1 of the second slice, then encoding chunk 2 of the first slice, then encoding chunk 2 of the second slice, and so on, until encoding chunk N of the first slice, and then encoding chunk N of the second slice. As shown in FIG. 6C, the length of each of odd numbered chunks such as chunk 1, chunk 3, and chunk 5 in respective slices is size 1, the length of each of even numbered chunks such as chunk 2, chunk 4, and chunk 6 in respective slices is size 2.

In embodiment 11, for the decoding end, the following steps can be taken to implement the decoding method.

The first step is to divide the image horizontally and vertically into SliceNumX*SliceNumY rectangular slices.

The second step is to calculate the total resources (total_resource) (i.e., the target transmission bits number) and determine the number (ChunkNum) of chunks based on the total resources.

For example, the total resources can be calculated using the following formula:

$$total\_resource = ((slice\_width * slice\_height * target\_bpp + 7) \gg 3) \ll 3; \text{ or}$$

$$total\_resource =$$

$$((slice\_width * slice\_height * target\_bpp + 7 + RC\_BUFFER\_LENGTH) \gg$$

$$3) \ll 3.$$

Based on the total resources (total_resource), the number ChunkNum of chunks can be calculated using the following formula:

$$ChunkNum = (total\_resource \gg s) \ll 1 + n.$$

In the above formula, the configured chunk size value s can be indicated by image level syntax parameters. The value of n can be calculated through the following formula:

$$left = (total\_resource - (ChunkNum - 1) \ll s), \text{ and}$$

$$n = left == 0 ? 0 : (left <= (1 \ll s + x) ? 1:2).$$

The third step is to receive the code stream, and for SliceNumX slices in each slice line, to sequentially parse for ChunkNum times, each time parsing SliceNumX chunks and deinterleaving the SliceNumX chunks into their respective bitstream buffers of the SliceNumX slices.

For example, for each slice, it is parsed for ChunkNum times to obtain ChunkNum chunks. The lengths of ChunkNum chunks can be calculated by lengths of all chunks (i.e., ChunkNum chunks) being switched between two fixed values, size 1 and size 2, in sequence. For example, the length of each of the odd numbered chunks is size 1, and the length of each of the even numbered chunks is size 2; or the length of each of the odd numbered chunk is size 2, and the length of each of the even numbered chunks is size 1. Where both size 1 and size 2 can be determined based on the chunk size value. For example, $$size\ 1 = (1 \ll s) + x, \text{ and}$$

$$size\ 2 = (1 \ll s) - x,$$

where x is a preset value. Due to the zero padding and byte alignment for the bitstream buffers based on the lengths of all chunks, the lengths of all chunks can be switched between size 1 and size 2 in sequence.

For example, there are SliceNumX slices within a slice line, and after generating SliceNumX bitstream buffers, the length of the bitstream buffer is 340, and the target transmission bits number is 360. In embodiments 3 to 10, zero padding and byte alignment are performed on the bitstream buffer to increase the length of the bitstream buffer from 340 to 360, which means the required length for zero padding is 20. In embodiment 11, size 1 is 99, size 2 is 101, and the number of chunks ChunkNum is 4. Thus, the length of the bitstream buffer needs to be 400, which is the sum of the lengths of two sizes 1 and two sizes 2. Therefore, when performing the zero padding and byte alignment on the bitstream buffer, it is necessary to make the length of the bitstream buffer from 340 to 400, that is, the required length for zero padding is 60, such that the lengths of all chunks can be switched between size 1 and size 2.

The fourth step is to decode each slice based on the bitstream buffer of each slice.

In an embodiment, when chunks exist in the bitstream buffers corresponding to the SliceNumX slices, decoding of the chunks corresponding to the SliceNumX slices starts. Where the chunks existing in the bitstream buffer corresponding to the SliceNumX slices can include but is not limited to: for each of the slices, T chunks of the slice exist in the bitstream buffer corresponding to the slice, where T is greater than or equal to 1, and T is less than the number of the chunks.

The fifth step is, after each slice is decoded, to obtain the reconstructed image of each slice.

The sixth step is to determine whether the parsing of code streams of all slice lines is completed. If not, it is returned to the third step to parse the next slice line. If so, the decoding process of the current image is completed and the next image can be parsed.

Embodiment 12

The length of the real encoded bits number for each slice is fixed, and the length of the real encoded bits number for each slice is not the target transmission bits number, but is determined based on the lengths of all chunks, that is, the sum of the lengths of all chunks. By performing zero padding and byte alignment on the bitstream buffers, the lengths of all chunks are switched between two fixed values based on the odd numbered chunks and the even numbered chunks. For example, the length of the odd numbered chunk is the first size, the length of the even numbered chunk is the second size. The length of the bitstream buffer are the sum of the lengths of the first-size chunks plus the lengths of the second-size chunks.

In embodiment 12, for the encoding end, the following steps can be taken to implement the encoding method.

The first step is to divide the image horizontally and vertically into SliceNumX*SliceNumY rectangular slices.

The second step is to calculate the total resources (total_resource) (i.e., the target transmission bits number) and determine the number (ChunkNum) of chunks based on the slice height (slice_height) of a slice. Details can be referred to the relevant introduction of the decoding end in the following embodiments, which will not be elaborated here.

The third step is to encode SliceNumX slices within each slice line in sequence, to generate SliceNumX bitstream buffers, and perform zero padding and byte alignment on the bitstream buffers.

For example, since each slice line contains SliceNumX slices, SliceNumX slices can be encoded to obtain SliceNumX bitstream buffers corresponding to the SliceNumX slices. For each bitstream buffer, zero padding and byte alignment can be performed on the bitstream buffer so that the length of the bitstream buffer is the sum of the lengths of all chunks, and the sum of the lengths of all chunks can be greater than or equal to the target transmission bits number. In other words, zero padding and byte alignment can be performed on the bitstream buffer according to the length of all chunks.

The fourth step is to divide each bitstream buffer into ChunkNum chunks.

For example, the calculation of the lengths of ChunkNum chunks can refer to the relevant introduction for the decoding end in the following embodiments, and will not be repeated here.

The fifth step is, for SliceNumX slices within a slice line, to encode for ChunkNum times in sequence, each time interleaving a chunk of each of SliceNumX slices to form a code stream.

In an embodiment, when chunks corresponding to all slices within a slice line have been obtained, interleaving of chunks corresponding to all SliceNumX slices is started to obtain the code stream; where the chunks corresponding to all slices within a slice line have been obtained, including: for each slice, S chunks corresponding to the slice have been obtained, where S is greater than or equal to 1 and S is less than the number of chunks.

The sixth step is to determine whether all slice lines have been encoded; and if not, return to the third step to encode the next slice line.

In embodiment 12, for the decoding end, the following steps can be taken to implement the decoding method.

The first step is to divide the image horizontally and vertically into SliceNumX*SliceNumY rectangular slices.

The second step is to calculate the total resources (total_resource) (i.e., the target transmission bits number) and determine the number (ChunkNum) of chunks based on the slice height (slice_height) of a slice.

For example, the total resources can be calculated using the following formula:

$$\text{total\_resource} = ((\text{slice\_width} * \text{slice\_height} * \text{target\_bpp} + 7) \gg 3) \ll 3; \text{ or}$$

$$\text{total\_resource} = $$
$$((\text{slice\_width} * \text{slice\_height} * \text{target\_bpp} + 7 + \text{RC\_BUFFER\_LENGTH}) \gg 3) \ll 3.$$

Based on the slice height (slice_height), the number ChunkNum of chunks can be calculated using the following formula:

$$\text{ChunkNum} = \text{slice\_height}.$$

The third step is to receive the code stream, and for SliceNumX slices in each slice line, to sequentially parse for ChunkNum times, each time parsing SliceNumX chunks and deinterleaving the SliceNumX chunks into their respective bitstream buffers of the SliceNumX slices.

For example, for each slice, it is parsed for ChunkNum times to obtain ChunkNum chunks. The lengths of ChunkNum chunks can be calculated by lengths of all ChunkNum chunks being switched between two fixed values, size 1 and size 2, in sequence. For example, the length of each of the odd numbered chunks is size 1, and the length of each of the even numbered chunks is size 2; or the length of each of the odd numbered chunk is size 2, and the length of each of the even numbered chunks is size 1. Where both size 1 and size 2 can be determined based on the number of pixels of a slice line, and the number of pixels in a slice line can be determined based on the slice width and the bit per pixel. For example, $$size\ 1 = (((slice\_width * bpp + 7) \ll 3) \gg 3) + x,\ and$$

$$size\ 2 = (((slice\_width * bpp + 7) \ll 3) \gg 3) - x.$$

where x is a preset value. For example, due to the zero padding and byte alignment for the bitstream buffer based on the lengths of all chunks, the lengths of all chunks can be switched between size 1 and size 2 in sequence.

For example, there are SliceNumX slices within a slice line, and after generating SliceNumX bitstream buffers, the length of the bitstream buffer is 340. Size 1 is 99, size 2 is 101, and the number of chunks ChunkNum is 4. Thus, the length of the bitstream buffer needs to be 400, which is the sum of the lengths of two sizes 1 and two sizes 2. Therefore, when performing the zero padding and byte alignment on the bitstream buffer, it is necessary to make the length of the bitstream buffer from 340 to 400, that is, the required length for zero padding is 60, such that the lengths of all chunks can be switched between size 1 and size 2.

The fourth step is to decode each slice based on the bitstream buffer of each slice.

In an embodiment, when chunks exist in the bitstream buffers corresponding to the SliceNumX slices, decoding of the chunks corresponding to the SliceNumX slices starts. Where the chunks existing in the bitstream buffer corresponding to the SliceNumX slices can include but is not limited to: for each of the slices, T chunks of the slice exist in the bitstream buffer corresponding to the slice, where T is greater than or equal to 1, and T is less than the number of the chunks.

The fifth step is, after each slice is decoded, to obtain the reconstructed image of each slice.

The sixth step is to determine whether the parsing of code streams of all slice lines is completed. If not, it is returned to the third step to parse the next slice line. If so, the decoding process of the current image is completed and the next image can be parsed.

Embodiment 13

The length of the bitstream buffer for each slice is not the target transmission bits number, but is the real encoded bits number, that is, zero padding and byte alignment are not performed on the bitstream buffers. For example, after encoding the slices to generate bitstream buffers, if the length of the bitstream buffer is 340, the real encoded bits number for the bitstream buffer is 340, without the need for additional zero padding operations. The length of each of the first (ChunkNum-1) chunks is fixed and referred to as the first size, and the length of the last chunk is not fixed and referred to as the second size. The code stream needs to include chunk length indicating information corresponding to the last chunk, where the chunk length indicating information indicates the length of the last chunk, i.e., the length of the second size.

In embodiment 13, for the encoding end, the following steps can be taken to implement the encoding method.

The first step is to divide the image horizontally and vertically into SliceNumX*SliceNumY rectangular slices.

The second step is to calculate the total resources (total_resource) (i.e., the target transmission bits number) and determine the number (ChunkNum) of chunks based on the total resources. Details can be referred to the relevant introduction of the decoding end in the following embodiments, which will not be elaborated here.

The third step is to encode SliceNumX slices within each slice line in sequence, to generate SliceNumX bitstream buffers, and calculate the real encoded bits number (real_bit) corresponding to each bitstream buffer.

For example, since each slice line contains SliceNumX slices, SliceNumX slices can be encoded to obtain SliceNumX bitstream buffers corresponding to the SliceNumX slices. After obtaining SliceNumX bitstream buffers, zero padding and byte alignment are no longer performed on the bitstream buffers, i.e., the length of the bitstream buffer is the real encoded bits number. In addition, the real encoded bits number (real_bit) corresponding to each bitstream buffer can be calculated.

The fourth step is to divide each bitstream buffer into ChunkNum chunks.

For example, the lengths of ChunkNum chunks can be calculated as follows: the length of each of the first (ChunkNum-1) chunks is size 1, and the length of the last chunk is size 2. Where size 1 can be determined based on the chunk size value, and size 2 can be determined based on the real encoded bits number, the number of chunks, and the chunk size value. For example, $$size\ 1 = 1 \ll s,\ and$$

$$size\ 2 = real\_bit - ((ChunkNum - 1) \ll s).$$

The fifth step is, for SliceNumX slices within a slice line, to encode for ChunkNum times in sequence, each time interleaving a chunk of each of SliceNumX slices to form a code stream.

In an embodiment, when chunks corresponding to all slices within a slice line have been obtained, interleaving of chunks corresponding to all SliceNumX slices is started to obtain the code stream; where the chunks corresponding to all slices within a slice line have been obtained, including: for each slice, S chunks corresponding to the slice have been obtained, where S is greater than or equal to 1 and S is less than the number of chunks.

For example, before encoding the last chunk, chunk header information (can be referred to as chunk length indicating information) can also be encoded in the code stream, where the chunk header information indicates the length of the last chunk, the value of size 2. For example, the chunk header information can be encoded by a fixed number of bits, such as a fixed 16 bits.

The sixth step is to determine whether all slice lines have been encoded; and if not, return to the third step to encode the next slice line.

For example, the process of interleaving the chunks when SliceNumX is equal to 2 can include: encoding chunk 1 of the first slice first, then encoding chunk 1 of the second slice, then encoding chunk 2 of the first slice, then encoding chunk 2 of the second slice, and so on, until encoding chunk N−1 of the first slice, and then encoding chunk N−1 of the second slice, and then encoding chunk header information 1 of chunk N of the first slice, where the chunk header information 1 indicates the length of chunk N of the first slice, and then encoding chunk N of the first slice, and then encoding chunk header information 2 of chunk N of the second slice, where chunk header information 2 indicates the length of chunk N of the second slice, and then encoding chunk N of the second slice. As shown in FIG. 7A, the length of each of chunks 1 to (N−1) is size 1. The length of chunk N in the first slice is not fixed and is indicated by the header information of chunk N in the first slice. The length of chunk N in the second slice is also not fixed (the length of chunk N in the second slice can be the same or different from the length of chunk N in the first slice) and is indicated by the header information of chunk N in the second slice.

In embodiment 13, for the decoding end, the following steps can be taken to implement the decoding method.

The first step is to divide the image horizontally and vertically into SliceNumX*SliceNumY rectangular slices.

The second step is to calculate the total resources (total_resource) (i.e., the target transmission bits number) and determine the number (ChunkNum) of chunks based on the total resources.

For example, the total resources can be calculated using the following formula:

$$total\_resource = ((slice\_width * slice\_height * target\_bpp + 7) >> 3) << 3;\ or$$

$$total\_resource = ((slice\_width * slice\_height * target\_bpp + 7 + RC\_BUFFER\_LENGTH) >> 3) << 3.$$

Based on the total resources (total_resource), the number ChunkNum of chunks can be calculated using the following formula:

$$ChunkNum = (total\_resource - RC\_BUFFER\_LENGTH) >> s + 1,$$

where the chunk size value s is a preset value that can be indicated by image level syntax parameters.

The third step is to receive the code stream, and for SliceNumX slices in each slice line, to sequentially parse for ChunkNum times, each time parsing SliceNumX chunks and deinterleaving the SliceNumX chunks into their respective bitstream buffers of the SliceNumX slices.

For example, before parsing the last chunk from the code stream, the chunk header information of the chunk can be parsed first, where the chunk header information indicates the length of the last chunk. The chunk header information can be parsed using a fixed number of bits, such as 16 bits. Based on the value indicated by the chunk header information, the last chunk is parsed from the code stream. For example, first the chunk header information of the last chunk of the first slice is parsed from the code stream, and the last chunk of the first slice is parsed based on this chunk header information, and then the chunk header information of the last chunk of the second slice is parsed from the code stream, and the last chunk of the second slice is parsed based on the chunk header information, and so on.

For example, for each slice, it is parsed for ChunkNum times to obtain ChunkNum chunks. The lengths of ChunkNum chunks can be calculated as follows: the length of each of the first (ChunkNum-1) chunks is size 1, and the length of the last chunk is size 2. For example, size 1=1<<s, and size 2 is the value indicated by the chunk header information of the last chunk.

The fourth step is to decode each slice based on the bitstream buffer of each slice.

In an embodiment, when chunks exist in the bitstream buffers corresponding to the SliceNumX slices, decoding of the chunks corresponding to the SliceNumX slices starts. Where the chunks existing in the bitstream buffer corresponding to the SliceNumX slices can include but is not limited to: for each of the slices, T chunks of the slice exist in the bitstream buffer corresponding to the slice, where T is greater than or equal to 1, and T is less than the number of the chunks.

The fifth step is, after each slice is decoded, to obtain the reconstructed image of each slice.

The sixth step is to determine whether the parsing of code streams of all slice lines is completed. If not, it is returned to the third step to parse the next slice line. If so, the decoding process of the current image is completed and the next image can be parsed.

Embodiment 14

The length of the bitstream buffer for each slice is not the target transmission bits number, but is the real encoded bits number, that is, zero padding and byte alignment are not performed on the bitstream buffers. The length of each of the last (ChunkNum-1) chunks is fixed and referred to as the first size, and the length of the first chunk is not fixed and referred to as the second size. The code stream needs to include chunk length indicating information corresponding to the first chunk, where the chunk length indicating information indicates the length of the first chunk.

In embodiment 14, for the encoding end, the following steps can be taken to implement the encoding method.

The first step is to divide the image horizontally and vertically into SliceNumX*SliceNumY rectangular slices.

The second step is to calculate the total resources (total_resource) (i.e., the target transmission bits number) and determine the number (ChunkNum) of chunks based on the total resources. Details can be referred to the relevant introduction of the decoding end in the following embodiments, which will not be elaborated here.

The third step is to encode SliceNumX slices within each slice line in sequence, to generate SliceNumX bitstream buffers, and calculate the real encoded bits number (real_bit) corresponding to each bitstream buffer.

For example, since each slice line contains SliceNumX slices, SliceNumX slices can be encoded to obtain SliceNumX bitstream buffers corresponding to the SliceNumX slices. After obtaining SliceNumX bitstream buffers, zero padding and byte alignment are no longer performed on the bitstream buffers, i.e., the length of the bitstream buffer is the real encoded bits number.

The fourth step is to divide each bitstream buffer into ChunkNum chunks.

For example, the lengths of ChunkNum chunks can be calculated as follows: the length of the first chunk is size 1, and the length of each of the last ChunkNum-1 chunks is size 2. Where size 2 can be determined based on the chunk size value, and size 1 can be determined based on the real encoded bits number, the number of chunks, and the chunk size value. For example, $$size\ 2 = 1 << s,\ and$$

$$size\ 1 = real\_bit - ((ChunkNum - 1) << s).$$

The fifth step is, for SliceNumX slices within a slice line, to encode for ChunkNum times in sequence, each time interleaving a chunk of each of SliceNumX slices to form a code stream.

In an embodiment, when chunks corresponding to all slices within a slice line have been obtained, interleaving of chunks corresponding to all SliceNumX slices is started to obtain the code stream; where the chunks corresponding to all slices within a slice line have been obtained, including: for each slice, S chunks corresponding to the slice have been obtained, where S is greater than or equal to 1 and S is less than the number of chunks.

For example, before encoding the first chunk, chunk header information (can be referred to as chunk length indicating information) can also be encoded in the code stream, where the chunk header information indicates the length of the first chunk, the value of size 1. For example, the chunk header information can be encoded by a fixed number of bits, such as a fixed 16 bits.

The sixth step is to determine whether all slice lines have been encoded; and if not, return to the third step to encode the next slice line.

For example, the process of interleaving the chunks when SliceNumX is equal to 2 can include: first encoding chunk header information 1 of chunk 1 of the first slice, where the chunk header information 1 indicates the length of chunk 1 of the first slice, and then encoding chunk 1 of the first slice, and then encoding chunk header information 2 of chunk 1 of the second slice, where chunk header information 2 indicates the length of chunk 1 of the second slice, and then encoding chunk 1 of the second slice. Then, chunk 2 of the first slice is encoded, chunk 2 of the second slice is encoded, chunk 3 of the first slice is encoded, chunk 3 of the second slice is encoded, and so on, until chunk N of the first slice is encoded, and then chunk N of the second slice is encoded. As shown in FIG. 7B, the lengths of chunks 2 to N are all size 1. The length of chunk 1 in the first slice is not fixed and is indicated by the header information of chunk 1 in the first slice. The length of chunk 1 in the second slice is also not fixed (the length of chunk 1 in the second slice can be the same or different from the length of chunk 1 in the first slice) and is indicated by the header information of chunk 1 in the second slice.

In embodiment 14, for the decoding end, the following steps can be taken to implement the decoding method.

The first step is to divide the image horizontally and vertically into SliceNumX*SliceNumY rectangular slices.

The second step is to calculate the total resources (total_resource) (i.e., the target transmission bits number) and determine the number (ChunkNum) of chunks based on the total resources.

For example, the total resources can be calculated using the following formula:

$$total\_resource = ((slice\_width * slice\_height * target\_bpp + 7) >> 3) <<$$
$$3; \text{ or}$$

$$total\_resource = ((slice\_width * slice\_height * target\_bpp + 7 +$$
$$RC\_BUFFER\_LENGTH) >> 3) << 3.$$

Based on the total resources (total_resource), the number ChunkNum of chunks can be calculated using the following formula:

$$ChunkNum = (total\_resource - RC\_BUFFER\_LENGTH) >> s + 1,$$

where the chunk size value s can be indicated by image level syntax parameters.

The third step is to receive the code stream, and for SliceNumX slices in each slice line, to sequentially parse for ChunkNum times, each time parsing SliceNumX chunks and deinterleaving the SliceNumX chunks into their respective bitstream buffers of the SliceNumX slices.

For example, before parsing the first chunk from the code stream, the chunk header information of the chunk can be parsed first, where the chunk header information indicates the length of the first chunk. The chunk header information can be parsed using a fixed number of bits, such as 16 bits.

Based on the value indicated by the chunk header information, the first chunk is parsed from the code stream. For example, first the chunk header information of the first chunk of the first slice is parsed from the code stream, and the first chunk of the first slice is parsed based on this chunk header information, and then the chunk header information of the first chunk of the second slice is parsed from the code stream, and the first chunk of the second slice is parsed based on the chunk header information, and so on.

For example, for each slice, it is parsed for ChunkNum times to obtain ChunkNum chunks. The lengths of Chunk-Num chunks can be calculated as follows: the length of the first chunk is size 1, and the length of each of the last (ChunkNum-1) chunks is size 2. For example, size 2=1<<s, and size 1 is the value indicated by the chunk header information of the first chunk.

The fourth step is to decode each slice based on the bitstream buffer of each slice.

In an embodiment, when chunks exist in the bitstream buffers corresponding to the SliceNumX slices, decoding of the chunks corresponding to the SliceNumX slices starts. Where the chunks existing in the bitstream buffer corresponding to the SliceNumX slices can include but is not limited to: for each of the slices, T chunks of the slice exist in the bitstream buffer corresponding to the slice, where T is greater than or equal to 1, and T is less than the number of the chunks.

The fifth step is, after each slice is decoded, to obtain the reconstructed image of each slice.

The sixth step is to determine whether the parsing of code streams of all slice lines is completed. If not, it is returned to the third step to parse the next slice line. If so, the decoding process of the current image is completed and the next image can be parsed.

Embodiment 15

The length of the bitstream buffer for each slice is not the target transmission bits number, but is the real encoded bits number, that is, zero padding and byte alignment are not performed on the bitstream buffers. The length of each of remaining (ChunkNum-1) chunks except the k-th chunk is fixed and referred to as the first size, and the length of the k-th chunk is not fixed and referred to as the second size. The code stream needs to include chunk length indicating information corresponding to the k-th chunk, where the chunk length indicating information indicates the length of the k-th chunk. The k-th chunk can be the last chunk of all chunks, the first chunk of all chunks, or any one chunk between the first and last chunks in all chunks.

In embodiment 15, for the encoding end, the following steps can be taken to implement the encoding method.

The first step is to divide the image horizontally and vertically into SliceNumX*SliceNumY rectangular slices.

The second step is to calculate the total resources (total_resource) (i.e., the target transmission bits number) and determine the number (ChunkNum) of chunks based on the total resources. Details can be referred to the relevant introduction of the decoding end in the following embodiments, which will not be elaborated here.

The third step is to encode SliceNumX slices within each slice line in sequence, to generate SliceNumX bitstream buffers, and calculate the real encoded bits number (real_bit) corresponding to each bitstream buffer.

For example, since each slice line contains SliceNumX slices, SliceNumX slices can be encoded to obtain SliceNumX bitstream buffers corresponding to the SliceNumX slices. After obtaining SliceNumX bitstream buffers, zero padding and byte alignment are no longer performed on the bitstream buffers, i.e., the length of the bitstream buffer is the real encoded bits number.

The fourth step is to divide each bitstream buffer into ChunkNum chunks.

For example, the lengths of ChunkNum chunks can be calculated as follows: the length of the k-th chunk is size 1, and the length of each of the remaining ChunkNum-1 chunks is size 2, where the value range of k is 1 to ChunkNum. Where size 2 can be determined based on the chunk size value, and size 1 can be determined based on the real encoded bits number, the number of chunks, and the chunk size value. For example, $$\text{size } 2 = 1 << s, \text{ and}$$

$$\text{size } 1 = \text{real\_bit} - ((ChunkNum - 1) << s).$$

The fifth step is, for SliceNumX slices within a slice line, to encode for ChunkNum times in sequence, each time interleaving a chunk of each of SliceNumX slices to form a code stream.

In an embodiment, when chunks corresponding to all slices within a slice line have been obtained, interleaving of chunks corresponding to all SliceNumX slices is started to obtain the code stream; where the chunks corresponding to all slices within a slice line have been obtained, including: for each slice, S chunks corresponding to the slice have been obtained, where S is greater than or equal to 1 and S is less than the number of chunks.

For example, before encoding the k-th chunk, chunk header information (can be referred to as chunk length indicating information) can also be encoded in the code stream, where the chunk header information indicates the length of the k-th chunk, the value of size 1. For example, the chunk header information can be encoded by a fixed number of bits, such as a fixed 16 bits.

The sixth step is to determine whether all slice lines have been encoded; and if not, return to the third step to encode the next slice line.

In embodiment 15, for the decoding end, the following steps can be taken to implement the decoding method.

The first step is to divide the image horizontally and vertically into SliceNumX*SliceNumY rectangular slices.

The second step is to calculate the total resources (total_resource) (i.e., the target transmission bits number) and determine the number (ChunkNum) of chunks based on the total resources.

For example, the total resources can be calculated using the following formula:

$$total\_resource = ((slice\_width * slice\_height * target\_bpp + 7) >> 3) << 3; \text{ or}$$

$$total\_resource = ((slice\_width * slice\_height * target\_bpp + 7 + RC\_BUFFER\_LENGTH) >> 3) << 3.$$

Based on the total resources (total_resource), the number ChunkNum of chunks can be calculated using the following formula:

$$ChunkNum = (total\_resource - RC\_BUFFER\_LENGTH) >> s + 1,$$

where the configured chunk size value s, can be indicated by image level syntax parameters.

The third step is to receive the code stream, and for SliceNumX slices in each slice line, to sequentially parse for ChunkNum times, each time parsing SliceNumX chunks and deinterleaving the SliceNumX chunks into their respective bitstream buffers of the SliceNumX slices.

For example, before parsing the k-th chunk from the code stream, the chunk header information of the chunk can be parsed first, where the chunk header information indicates the length of the k-th chunk. The chunk header information can be parsed using a fixed number of bits, such as 16 bits.

Based on the value indicated by the chunk header information, the k-th chunk is parsed from the code stream. For example, first the chunk header information of the k-th chunk of the first slice is parsed from the code stream, and the k-th chunk of the first slice is parsed based on this chunk header information, and then the chunk header information of the k-th chunk of the second slice is parsed from the code stream, and the k-th chunk of the second slice is parsed based on the chunk header information, and so on.

For example, for each slice, it is parsed for ChunkNum times to obtain ChunkNum chunks. The lengths of ChunkNum chunks can be calculated as follows: the length of the k-th chunk is size 1, and the length of each of the remaining (ChunkNum-1) chunks is size 2. For example, size 2=1<<s, and size 1 is the value indicated by the chunk header information of the k-th chunk.

The fourth step is to decode each slice based on the bitstream buffer of each slice.

In an embodiment, when chunks exist in the bitstream buffers corresponding to the SliceNumX slices, decoding of the chunks corresponding to the SliceNumX slices starts. Where the chunks existing in the bitstream buffer corresponding to the SliceNumX slices can include but is not limited to: for each of the slices, T chunks of the slice exist in the bitstream buffer corresponding to the slice, where T is greater than or equal to 1, and T is less than the number of the chunks.

The fifth step is, after each slice is decoded, to obtain the reconstructed image of each slice.

The sixth step is to determine whether the parsing of code streams of all slice lines is completed. If not, it is returned to the third step to parse the next slice line. If so, the decoding process of the current image is completed and the next image can be parsed.

47

Embodiment 16

The length of the bitstream buffer for each slice is not the target transmission bits number, but is the real encoded bits number, that is, zero padding and byte alignment are not performed on the bitstream buffers. The length of each of remaining (ChunkNum-1) chunks except the k-th chunk is fixed and referred to as the first size, and the length of the k-th chunk is not fixed and referred to as the second size. The code stream needs to include chunk length indicating information corresponding to the k-th chunk, where the chunk length indicating information indicates the length of the k-th chunk. The k-th chunk can be the last chunk of all chunks, the first chunk of all chunks, or any one chunk between the first and last chunks in all chunks.

In embodiment 16, for the encoding end, the following steps can be taken to implement the encoding method.

The first step is to divide the image horizontally and vertically into SliceNumX*SliceNumY rectangular slices.

The second step is to calculate the total resources (total_resource) (i.e., the target transmission bits number) and determine the number (ChunkNum) of chunks based on the slice height (slice_height) of a slice. Details can be referred to the relevant introduction of the decoding end in the following embodiments, which will not be elaborated here.

The third step is to encode SliceNumX slices within each slice line in sequence, to generate SliceNumX bitstream buffers, and calculate the real encoded bits number (real_bit) corresponding to each bitstream buffer.

For example, since each slice line contains SliceNumX slices, SliceNumX slices can be encoded to obtain SliceNumX bitstream buffers corresponding to the SliceNumX slices. After obtaining SliceNumX bitstream buffers, zero padding and byte alignment are no longer performed on the bitstream buffers, i.e., the length of the bitstream buffer is the real encoded bits number.

The fourth step is to divide each bitstream buffer into ChunkNum chunks.

For example, the lengths of ChunkNum chunks can be calculated as follows: the length of the k-th chunk is size 1, and the length of each of the remaining ChunkNum-1 chunks is size 2, where the value range of k is 1 to ChunkNum. Where size 2 can be determined based on the slice width and the bit per pixel, and size 1 can be determined based on the real encoded bits number, the number of chunks, and size 2. For example, $$\text{size } 2 = (((\text{slice\_width} * bpp) << 3) >> 3), \text{ and}$$

$$\text{size } 1 = \text{real\_bit} - ((ChunkNum - 1) * \text{size } 2).$$

The fifth step is, for SliceNumX slices within a slice line, to encode for ChunkNum times in sequence, each time interleaving a chunk of each of SliceNumX slices to form a code stream.

In an embodiment, when chunks corresponding to all slices within a slice line have been obtained, interleaving of chunks corresponding to all SliceNumX slices is started to obtain the code stream; where the chunks corresponding to all slices within a slice line have been obtained, including: for each slice, S chunks corresponding to the slice have been obtained, where S is greater than or equal to 1 and S is less than the number of chunks.

For example, before encoding the k-th chunk, chunk header information (can be referred to as chunk length indicating information) can also be encoded in the code stream, where the chunk header information indicates the length of the k-th chunk, the value of size 1. For example, the chunk header information can be encoded by a fixed number of bits, such as a fixed 16 bits.

The sixth step is to determine whether all slice lines have been encoded; and if not, return to the third step to encode the next slice line.

In embodiment 16, for the decoding end, the following steps can be taken to implement the decoding method.

The first step is to divide the image horizontally and vertically into SliceNumX*SliceNumY rectangular slices.

The second step is to calculate the total resources (total_resource) (i.e., the target transmission bits number) and determine the number (ChunkNum) of chunks based on the slice height (slice_height) of a slice.

For example, the total resources can be calculated using the following formula:

$$\text{total\_resource} = ((\text{slice\_width} * \text{slice\_height} * \text{target\_bpp} + 7) >> 3) <<$$

$$3; \text{ or}$$

$$\text{total\_resource} = ((\text{slice\_width} * \text{slice\_height} * \text{target\_bpp} + 7 +$$

$$\text{RC\_BUFFER\_LENGTH}) >> 3) << 3.$$

Based on the slice height (slice_height), the number ChunkNum of chunks can be calculated using the following formula:

$$\text{ChunkNum} = \text{slice\_height}.$$

The third step is to receive the code stream, and for SliceNumX slices in each slice line, to sequentially parse for ChunkNum times, each time parsing SliceNumX chunks and deinterleaving the SliceNumX chunks into their respective bitstream buffers of the SliceNumX slices.

For example, before parsing the k-th chunk from the code stream, the chunk header information of the chunk can be parsed first, where the chunk header information indicates the length of the k-th chunk. The chunk header information can be parsed using a fixed number of bits, such as 16 bits.

Based on the value indicated by the chunk header information, the k-th chunk is parsed from the code stream. For example, first the chunk header information of the k-th chunk of the first slice is parsed from the code stream, and the k-th chunk of the first slice is parsed based on this chunk header information, and then the chunk header information of the k-th chunk of the second slice is parsed from the code stream, and the k-th chunk of the second slice is parsed based on the chunk header information, and so on.

For example, for each slice, it is parsed for ChunkNum times to obtain ChunkNum chunks. The lengths of ChunkNum chunks can be calculated as follows: the length of the k-th chunk is size 1, and the length of each of the remaining (ChunkNum-1) chunks is size 2. Size 2=(((slice_width* bpp)<<3)>>3), and size 1 is the value indicated by the chunk header information of the k-th chunk.

The fourth step is to decode each slice based on the bitstream buffer of each slice.

In an embodiment, when chunks exist in the bitstream buffers corresponding to the SliceNumX slices, decoding of the chunks corresponding to the SliceNumX slices starts. Where the chunks existing in the bitstream buffer corresponding to the SliceNumX slices can include but is not limited to: for each of the slices, T chunks of the slice exist in the bitstream buffer corresponding to the slice, where T is greater than or equal to 1, and T is less than the number of the chunks.

The fifth step is, after each slice is decoded, to obtain the reconstructed image of each slice.

The sixth step is to determine whether the parsing of code streams of all slice lines is completed. If not, it is returned to the third step to parse the next slice line. If so, the decoding process of the current image is completed and the next image can be parsed.

Embodiment 17

The length of the real encoded bits number for each slice is fixed, for example, the length of the real encoded bits number for each slice is equal to the target transmission bits number. The length of each of the first (ChunkNum-1) chunks is fixed and referred to as the first size, and the length of the last chunk is not fixed and referred to as the second size. The code stream needs to include chunk length indicating information corresponding to the last chunk, where the chunk length indicating information indicates the length of the last chunk.

In embodiment 17, for the encoding end, the following steps can be taken to implement the encoding method.

The first step is to divide the image horizontally and vertically into SliceNumX*SliceNumY rectangular slices.

The second step is to calculate the total resources (total_resource) (i.e., the target transmission bits number) and determine the number (ChunkNum) of chunks based on the total resources. Details can be referred to the relevant introduction of the decoding end in the following embodiments, which will not be elaborated here.

The third step is to encode SliceNumX slices within each slice line in sequence, to generate SliceNumX bitstream buffers, and perform zero padding and byte alignment on the bitstream buffers.

For example, since each slice line contains SliceNumX slices, SliceNumX slices can be encoded to obtain SliceNumX bitstream buffers corresponding to the SliceNumX slices. For each bitstream buffer, zero padding and byte alignment can be performed on the bitstream buffer to ensure that the length of the bitstream buffer is equal to the target transmission bits number, that is, zero padding and byte alignment is performed on the bitstream buffer according to the target transmission bits number.

The fourth step is to divide each bitstream buffer into ChunkNum chunks.

For example, the lengths of ChunkNum chunks can be calculated as follows: the length of each of the first (Chunk-Num-1) chunks is size 1, and the length of the last chunk is size 2. Where size 1 can be determined based on the chunk size value, and size 2 can be determined based on the total resources, the number of chunks, and the chunk size value. For example, $$\text{size } 1 = 1 << s,$$

$$\text{size } 2 = \text{total\_source} - (ChunkNum - 1) << s.$$

The fifth step is, for SliceNumX slices within a slice line, to encode for ChunkNum times in sequence, each time interleaving a chunk of each of SliceNumX slices to form a code stream.

In an embodiment, when chunks corresponding to all slices within a slice line have been obtained, interleaving of chunks corresponding to all SliceNumX slices is started to obtain the code stream; where the chunks corresponding to all slices within a slice line have been obtained, including: for each slice, S chunks corresponding to the slice have been obtained, where S is greater than or equal to 1 and S is less than the number of chunks.

For example, before encoding the last chunk, chunk header information (can be referred to as chunk length indicating information) can also be encoded in the code stream, where the chunk header information indicates the length of the last chunk, the value of size 2. The chunk header information can be encoded by a fixed number of bits, such as a fixed 16 bits.

The sixth step is to determine whether all slice lines have been encoded; and if not, return to the third step to encode the next slice line.

For example, the process of interleaving the chunks when SliceNumX is equal to 2 can include: encoding chunk 1 of the first slice first, then encoding chunk 1 of the second slice, then encoding chunk 2 of the first slice, then encoding chunk 2 of the second slice, and so on, until encoding chunk N−1 of the first slice, and then encoding chunk N−1 of the second slice, and then encoding chunk header information 1 of chunk N of the first slice, where the chunk header information 1 indicates the length of chunk N of the first slice, and then encoding chunk N of the first slice, and then encoding chunk header information 2 of chunk N of the second slice, where chunk header information 2 indicates the length of chunk N of the second slice, and then encoding chunk N of the second slice. As shown in FIG. 8A, the lengths of chunks 1 to (N−1) are all size 1. The length of chunk N in the first slice is not fixed and is indicated by the header information of chunk N in the first slice. The length of chunk N in the second slice is also not fixed and is indicated by the header information of chunk N in the second slice.

In embodiment 17, for the decoding end, the following steps can be taken to implement the decoding method.

The first step is to divide the image horizontally and vertically into SliceNumX*SliceNumY rectangular slices.

The second step is to calculate the total resources (total_resource) (i.e., the target transmission bits number) and determine the number (ChunkNum) of chunks based on the total resources.

For example, the total resources can be calculated using the following formula:

$$\text{total\_resource} = ((\text{slice\_width} * \text{slice\_height} * \text{target\_bpp} + 7) >> 3) << 3; \text{or}$$

$$\text{total\_resource} = ((\text{slice\_width} * \text{slice\_height} * \text{target\_bpp} + 7 + \text{RC\_BUFFER\_LENGTH}) >> 3) << 3.$$

Based on the total resources (total_resource), the number ChunkNum of chunks can be calculated using the following formula:

$$ChunkNum = (\text{total\_resource}) >> s + n.$$

Where the chunk size value s is a preset value, and the value of n can be calculated by the following formula:

$$n = \text{total\_resource} \% (1 << s) == 0?0:1.$$

The third step is to receive the code stream, and for SliceNumX slices in each slice line, to sequentially parse for ChunkNum times, each time parsing SliceNumX chunks and deinterleaving the SliceNumX chunks into their respective bitstream buffers of the SliceNumX slices.

For example, before parsing the last chunk from the code stream, the chunk header information of the chunk can be parsed first, where the chunk header information indicates the length of the last chunk. The chunk header information can be parsed using a fixed number of bits, such as 16 bits. Based on the value indicated by the chunk header information, the last chunk is parsed from the code stream. For example, first the chunk header information of the last chunk of the first slice is parsed from the code stream, and the last chunk of the first slice is parsed based on this chunk header information, and then the chunk header information of the last chunk of the second slice is parsed from the code stream, and the last chunk of the second slice is parsed based on the chunk header information, and so on.

For example, for each slice, it is parsed for ChunkNum times to obtain ChunkNum chunks. The lengths of ChunkNum chunks can be calculated as follows: the length of each of the first (ChunkNum-1) chunks is size 1, and the length of the last chunk is size 2. For example, size 1=1<<s, and size 2 is the value indicated by the chunk header information of the last chunk.

The fourth step is to decode each slice based on the bitstream buffer of each slice.

In an embodiment, when chunks exist in the bitstream buffers corresponding to the SliceNumX slices, decoding of the chunks corresponding to the SliceNumX slices starts. Where the chunks existing in the bitstream buffer corresponding to the SliceNumX slices can include but is not limited to: for each of the slices, T chunks of the slice exist in the bitstream buffer corresponding to the slice, where T is greater than or equal to 1, and T is less than the number of the chunks.

The fifth step is, after each slice is decoded, to obtain the reconstructed image of each slice.

The sixth step is to determine whether the parsing of code streams of all slice lines is completed. If not, it is returned to the third step to parse the next slice line. If so, the decoding process of the current image is completed and the next image can be parsed.

Embodiment 18

The length of the real encoded bits number for each slice is fixed, for example, the length of the real encoded bits number for each slice is equal to the target transmission bits number. The length of each of the last (ChunkNum-1) chunks is fixed and referred to as the first size, and the length of the first chunk is not fixed and referred to as the second size. The code stream needs to include chunk length indicating information corresponding to the first chunk, where the chunk length indicating information indicates the length of the first chunk.

In embodiment 18, for the encoding end, the following steps can be taken to implement the encoding method.

The first step is to divide the image horizontally and vertically into SliceNumX*SliceNumY rectangular slices.

The second step is to calculate the total resources (total_resource) (i.e., the target transmission bits number) and determine the number (ChunkNum) of chunks based on the total resources. Details can be referred to the relevant introduction of the decoding end in the following embodiments, which will not be elaborated here.

The third step is to encode SliceNumX slices within each slice line in sequence, to generate SliceNumX bitstream buffers, and perform zero padding and byte alignment on the bitstream buffers.

For example, since each slice line contains SliceNumX slices, SliceNumX slices can be encoded to obtain SliceNumX bitstream buffers corresponding to the SliceNumX slices. For each bitstream buffer, zero padding and byte alignment can be performed on the bitstream buffer to ensure that the length of the bitstream buffer is equal to the target transmission bits number, that is, zero padding and byte alignment is performed on the bitstream buffer according to the target transmission bits number.

The fourth step is to divide each bitstream buffer into ChunkNum chunks.

For example, the lengths of ChunkNum chunks can be calculated as follows: the length of the first chunk is size 1, and the length of each of the last ChunkNum-1 chunks is size 2. Where size 2 can be determined based on the chunk size value, and size 1 can be determined based on the total resources, the number of chunks, and the chunk size value. For example, $$\text{size } 2 = 1 << s,$$

$$\text{size } 1 = \text{total\_source} - ((ChunkNum - 1) << s).$$

The fifth step is, for SliceNumX slices within a slice line, to encode for ChunkNum times in sequence, each time interleaving a chunk of each of SliceNumX slices to form a code stream.

In an embodiment, when chunks corresponding to all slices within a slice line have been obtained, interleaving of chunks corresponding to all SliceNumX slices is started to obtain the code stream; where the chunks corresponding to all slices within a slice line have been obtained, including: for each slice, S chunks corresponding to the slice have been obtained, where S is greater than or equal to 1 and S is less than the number of chunks.

For example, before encoding the first chunk, chunk header information (can be referred to as chunk length indicating information) can also be encoded in the code stream, where the chunk header information indicates the length of the first chunk, the value of size 1. The chunk header information can be encoded by a fixed number of bits, such as a fixed 16 bits.

The sixth step is to determine whether all slice lines have been encoded; and if not, return to the third step to encode the next slice line.

For example, the process of interleaving the chunks when SliceNumX is equal to 2 can include: encoding chunk header information 1 of chunk 1 of the first slice, where the chunk header information 1 indicates the length of chunk 1 of the first slice; encoding chunk 1 of the first slice; encoding chunk header information 2 of chunk 1 of the second slice, where chunk header information 2 indicates the length of chunk 1 of the second slice, and then encoding chunk 1 of the second slice. Then, chunk 2 of the first slice is encoded, chunk 2 of the second slice is encoded, chunk 3 of the first slice is encoded, chunk 3 of the second slice is encoded, and so on, until chunk N of the first slice is encoded, and then chunk N of the second slice is encoded. As shown in FIG. 8B, the lengths of chunks 2 to N are all size 1. The length of chunk 1 in the first slice is not fixed and is indicated by the header of chunk 1 in the first slice. The length of chunk 1 in the second slice is not fixed and is indicated by the header of chunk 1 in the second slice.

In embodiment 18, for the decoding end, the following steps can be taken to implement the decoding method.

The first step is to divide the image horizontally and vertically into SliceNumX*SliceNumY rectangular slices.

The second step is to calculate the total resources (total_resource) (i.e., the target transmission bits number) and determine the number (ChunkNum) of chunks based on the total resources.

For example, the total resources can be calculated using the following formula:

$$total\_resource = ((slice\_width * slice\_height * target\_bpp + 7) >> 3) << 3;$$

or $$total\_resource = ((slice\_width * slice\_height * target\_bpp + 7 + RC\_BUFFER\_LENGTH) >> 3) << 3.$$

Based on the total resources (total_resource), the number ChunkNum of chunks can be calculated using the following formula:

$$ChunkNum = (total\_resource) >> s + n.$$

Where the chunk size value s is a preset value, and the value of n can be calculated by the following formula:

$$n = total\_resource \% (1 << s) == 0 ? 0:1.$$

The third step is to receive the code stream, and for SliceNumX slices in each slice line, to sequentially parse for ChunkNum times, each time parsing SliceNumX chunks and deinterleaving the SliceNumX chunks into their respective bitstream buffers of the SliceNumX slices.

For example, before parsing the first chunk from the code stream, the chunk header information of the chunk can be parsed first, where the chunk header information indicates the length of the first chunk. The chunk header information can be parsed using a fixed number of bits, such as 16 bits. Based on the value indicated by the chunk header information, the first chunk is parsed from the code stream. For example, first the chunk header information of the first chunk of the first slice is parsed from the code stream, and the first chunk of the first slice is parsed based on this chunk header information, and then the chunk header information of the first chunk of the second slice is parsed from the code stream, and the first chunk of the second slice is parsed based on the chunk header information, and so on.

For example, for each slice, it is parsed for ChunkNum times to obtain ChunkNum chunks. The lengths of ChunkNum chunks can be calculated as follows: the length of the first chunk is size 1, and the length of each of the last (ChunkNum-1) chunks is size 2. For example, size 2=1<<s, and size 1 is the value indicated by the chunk header information of the first chunk.

The fourth step is to decode each slice based on the bitstream buffer of each slice.

In an embodiment, when chunks exist in the bitstream buffers corresponding to the SliceNumX slices, decoding of the chunks corresponding to the SliceNumX slices starts. Where the chunks existing in the bitstream buffer corresponding to the SliceNumX slices can include but is not limited to: for each of the slices, T chunks of the slice exist in the bitstream buffer corresponding to the slice, where T is greater than or equal to 1, and T is less than the number of the chunks.

The fifth step is, after each slice is decoded, to obtain the reconstructed image of each slice.

The sixth step is to determine whether the parsing of code streams of all slice lines is completed. If not, it is returned to the third step to parse the next slice line. If so, the decoding process of the current image is completed and the next image can be parsed.

Embodiment 19

The length of the real encoded bits number for each slice is fixed, for example, the length of the real encoded bits number for each slice is equal to the target transmission bits number. The length of each of the remaining (ChunkNum-1) chunks except the k-th chunk is fixed and referred to as the first size, and the length of the k-th chunk is not fixed and referred to as the second size. The code stream needs to include chunk length indicating information corresponding to the k-th chunk, where the chunk length indicating information indicates the length of the k-th chunk. The k-th chunk can be the last chunk of all chunks, the first chunk of all chunks, or any one chunk between the first and last chunks in all chunks.

In embodiment 19, for the encoding end, the following steps can be taken to implement the encoding method.

The first step is to divide the image horizontally and vertically into SliceNumX*SliceNumY rectangular slices.

The second step is to calculate the total resources (total_resource) (i.e., the target transmission bits number) and determine the number (ChunkNum) of chunks based on the total resources. Details can be referred to the relevant introduction of the decoding end in the following embodiments, which will not be elaborated here.

The third step is to encode SliceNumX slices within each slice line in sequence, to generate SliceNumX bitstream buffers, and perform zero padding and byte alignment on the bitstream buffers.

For example, since each slice line contains SliceNumX slices, SliceNumX slices can be encoded to obtain SliceNumX bitstream buffers corresponding to the SliceNumX slices. For each bitstream buffer, zero padding and byte alignment can be performed on the bitstream buffer to ensure that the length of the bitstream buffer is equal to the target transmission bits number, that is, zero padding and byte alignment is performed on the bitstream buffer according to the target transmission bits number.

The fourth step is to divide each bitstream buffer into ChunkNum chunks.

For example, the lengths of ChunkNum chunks can be calculated as follows: the length of the k-th chunk is size 1, and the length of each of the remaining ChunkNum-1 chunks is size 2. Where size 2 can be determined based on the chunk size value, and size 1 can be determined based on the total resources, the number of chunks, and the chunk size value. For example, $$\text{size } 2 = 1 << s,$$

$$\text{size } 1 = \text{total\_source} - ((ChunkNum - 1) << s).$$

The fifth step is, for SliceNumX slices within a slice line, to encode for ChunkNum times in sequence, each time interleaving a chunk of each of SliceNumX slices to form a code stream.

For example, before encoding the k-th chunk, chunk header information (can be referred to as chunk length indicating information) can also be encoded in the code stream, where the chunk header information indicates the length of the k-th chunk, the value of size 1. For example, the chunk header information can be encoded by a fixed number of bits, such as a fixed 16 bits.

In an embodiment, when chunks corresponding to all slices within a slice line have been obtained, interleaving of chunks corresponding to all SliceNumX slices is started to obtain the code stream; where the chunks corresponding to all slices within a slice line have been obtained, including: for each slice, S chunks corresponding to the slice have been obtained, where S is greater than or equal to 1 and S is less than the number of chunks.

The sixth step is to determine whether all slice lines have been encoded; and if not, return to the third step to encode the next slice line.

In embodiment 19, for the decoding end, the following steps can be taken to implement the decoding method.

The first step is to divide the image horizontally and vertically into SliceNumX*SliceNumY rectangular slices.

The second step is to calculate the total resources (total_resource) (i.e., the target transmission bits number) and determine the number (ChunkNum) of chunks based on the total resources.

For example, the total resources can be calculated using the formula:

$$\text{total\_resource} = ((\text{slice\_width} * \text{slice\_height} * \text{target\_bpp} + 7) >> 3) << 3;$$

or $$\text{total\_resource} = ((\text{slice\_width} * \text{slice\_height} * \text{target\_bpp} + 7 +$$
$$\text{RC\_BUFFER\_LENGTH}) >> 3) << 3.$$

Based on the total resources (total_resource), the number ChunkNum of chunks can be calculated using the following formula:

$$ChunkNum = (\text{total\_resource}) >> s + n.$$

The chunk size value s is a preset value, and the value of n can be calculated by the following formula:

$$n = \text{total\_resource} \% (1 << s) == 0 ? 0 : 1.$$

The third step is to receive the code stream, and for SliceNumX slices in each slice line, to sequentially parse for ChunkNum times, each time parsing SliceNumX chunks and deinterleaving the SliceNumX chunks into their respective bitstream buffers of the SliceNumX slices.

For example, before parsing the k-th chunk from the code stream, the chunk header information of the chunk can be parsed first, where the chunk header information indicates the length of the k-th chunk. The chunk header information can be parsed using a fixed number of bits, such as 16 bits. Based on the value indicated by the chunk header information, the k-th chunk is parsed from the code stream.

For example, for each slice, it is parsed for ChunkNum times to obtain ChunkNum chunks. The lengths of Chunk-Num chunks can be calculated as follows: the length of the k-th chunk is size 1, and the length of each of the remaining (ChunkNum-1) chunks is size 2. For example, size 2=1<<s, and size 1 is the value indicated by the chunk header information of the k-th chunk.

The fourth step is to decode each slice based on the bitstream buffer of each slice.

In an embodiment, when chunks exist in the bitstream buffers corresponding to the SliceNumX slices, decoding of the chunks corresponding to the SliceNumX slices starts. Where the chunks existing in the bitstream buffer corresponding to the SliceNumX slices can include but is not limited to: for each of the slices, T chunks of the slice exist in the bitstream buffer corresponding to the slice, where T is greater than or equal to 1, and T is less than the number of the chunks.

The fifth step is, after each slice is decoded, to obtain the reconstructed image of each slice.

The sixth step is to determine whether the parsing of code streams of all slice lines is completed. If not, it is returned to the third step to parse the next slice line. If so, the decoding process of the current image is completed and the next image can be parsed.

Embodiment 20

The length of the real encoded bits number for each slice is fixed, for example, the length of the real encoded bits number for each slice is equal to the target transmission bits number. The length of each of the remaining (ChunkNum-1) chunks except the k-th chunk is fixed and referred to as the first size, and the length of the k-th chunk is not fixed and referred to as the second size. The code stream needs to include chunk length indicating information corresponding to the k-th chunk, where the chunk length indicating information indicates the length of the k-th chunk. The k-th chunk can be the last chunk of all chunks, the first chunk of all chunks, or any one chunk between the first and last chunks in all chunks.

In embodiment 20, for the encoding end, the following steps can be taken to implement the encoding method.

The first step is to divide the image horizontally and vertically into SliceNumX*SliceNumY rectangular slices.

The second step is to calculate the total resources (total_resource) (i.e., the target transmission bits number) and determine the number (ChunkNum) of chunks based on the slice height (slice_height) of a slice. Details can be referred to the relevant introduction of the decoding end in the following embodiments, which will not be elaborated here.

The third step is to encode SliceNumX slices within each slice line in sequence, to generate SliceNumX bitstream buffers, and perform zero padding and byte alignment on the bitstream buffers.

For example, since each slice line contains SliceNumX slices, SliceNumX slices can be encoded to obtain SliceNumX bitstream buffers corresponding to the SliceNumX slices. For each bitstream buffer, zero padding and byte alignment can be performed on the bitstream buffer to ensure that the length of the bitstream buffer is equal to the target transmission bits number, that is, zero padding and byte alignment is performed on the bitstream buffer according to the target transmission bits number.

The fourth step is to divide each bitstream buffer into ChunkNum chunks.

For example, the lengths of ChunkNum chunks can be calculated as follows: the length of the k-th chunk is size 1, and the length of each of the remaining ChunkNum-1 chunks is size 2, where the value range of k is 1 to ChunkNum. Where size 2 can be determined based on the slice width and the bit per pixel, and size 1 can be determined based on the total resources, the number of chunks, and size 2. For example, $$size\ 2 = (((slice\_width * bpp + 7) << 3) >> 3),$$

and $$size\ 1 = total\_resource - ((ChunkNum - 1) * size\ 2).$$

The fifth step is, for SliceNumX slices within a slice line, to encode for ChunkNum times in sequence, each time interleaving a chunk of each of SliceNumX slices to form a code stream.

For example, before encoding the k-th chunk, chunk header information (can be referred to as chunk length indicating information) can also be encoded in the code stream, where the chunk header information indicates the length of the k-th chunk, the value of size 1. For example, the chunk header information can be encoded by a fixed number of bits, such as a fixed 16 bits.

In an embodiment, when chunks corresponding to all slices within a slice line have been obtained, interleaving of chunks corresponding to all SliceNumX slices is started to obtain the code stream; where the chunks corresponding to all slices within a slice line have been obtained, including: for each slice, S chunks corresponding to the slice have been obtained, where S is greater than or equal to 1 and S is less than the number of chunks.

The sixth step is to determine whether all slice lines have been encoded; and if not, return to the third step to encode the next slice line.

In embodiment 20, for the decoding end, the following steps can be taken to implement the decoding method.

The first step is to divide the image horizontally and vertically into SliceNumX*SliceNumY rectangular slices.

The second step is to calculate the total resources (total_resource) (i.e., the target transmission bits number) and determine the number (ChunkNum) of chunks based on the slice height (slice_height) of a slice.

For example, the total resources can be calculated using the following formula:

$$total\_resource = ((slice\_width * slice\_height * target\_bpp + 7) >> 3) << 3;$$

or $$total\_resource = ((slice\_width * slice\_height * target\_bpp + 7 +$$
$$RC\_BUFFER\_LENGTH) >> 3) << 3.$$

Based on the slice height (slice_height), the number ChunkNum of chunks can be calculated using the following formula:

$$ChunkNum = slice\_height.$$

The third step is to receive the code stream, and for SliceNumX slices in each slice line, to sequentially parse for ChunkNum times, each time parsing SliceNumX chunks and deinterleaving the SliceNumX chunks into their respective bitstream buffers of the SliceNumX slices.

For example, before parsing the k-th chunk from the code stream, the chunk header information of the chunk can be parsed first, where the chunk header information indicates the length of the k-th chunk. The chunk header information can be parsed using a fixed number of bits, such as 16 bits. Based on the value indicated by the chunk header information, the k-th chunk is parsed from the code stream.

For example, for each slice, it is parsed for ChunkNum times to obtain ChunkNum chunks. The lengths of ChunkNum chunks can be calculated as follows: the length of the k-th chunk is size 1, and the length of each of the remaining (ChunkNum-1) chunks is size 2. Size 2=(((slice_width*bpp+7)<<3)>>3), and size 1 is the value indicated by the chunk header information of the k-th chunk.

The fourth step is to decode each slice based on the bitstream buffer of each slice.

In an embodiment, when chunks exist in the bitstream buffers corresponding to the SliceNumX slices, decoding of the chunks corresponding to the SliceNumX slices starts. Where the chunks existing in the bitstream buffer corresponding to the SliceNumX slices can include but is not limited to: for each of the slices, T chunks of the slice exist in the bitstream buffer corresponding to the slice, where T is greater than or equal to 1, and T is less than the number of the chunks.

The fifth step is, after each slice is decoded, to obtain the reconstructed image of each slice.

The sixth step is to determine whether the parsing of code streams of all slice lines is completed. If not, it is returned to the third step to parse the next slice line. If so, the decoding process of the current image is completed and the next image can be parsed.

Embodiment 21

The length of the real encoded bits number for each slice is fixed, for example, the length of the real encoded bits number for each slice is equal to the target transmission bits number. The length of each of the remaining (ChunkNum-1) chunks except the k-th chunk is fixed and referred to as the first size, and the length of the k-th chunk is not fixed and referred to as the second size. The code stream needs to include chunk length indicating information corresponding to the k-th chunk, where the chunk length indicating information indicates the length of the k-th chunk. The k-th chunk can be the last chunk of all chunks, the first chunk of all chunks, or any one chunk between the first and last chunks in all chunks.

In embodiment 21, for the encoding end, the following steps can be taken to implement the encoding method.

The first step is to divide the image horizontally and vertically into SliceNumX*SliceNumY rectangular slices.

The second step is to calculate the total resources (total_resource) (i.e., the target transmission bits number) and determine the number (ChunkNum) of chunks based on the slice height (slice_height) of a slice. Details can be referred to the relevant introduction of the decoding end in the following embodiments, which will not be elaborated here.

The third step is to encode SliceNumX slices within each slice line in sequence, to generate SliceNumX bitstream buffers, and perform zero padding and byte alignment on the bitstream buffers.

For example, since each slice line contains SliceNumX slices, SliceNumX slices can be encoded to obtain SliceNumX bitstream buffers corresponding to the SliceNumX slices. For each bitstream buffer, zero padding and byte alignment can be performed on the bitstream buffer to ensure that the length of the bitstream buffer is equal to the target transmission bits number, that is, zero padding and byte alignment is performed on the bitstream buffer according to the target transmission bits number.

The fourth step is to divide each bitstream buffer into ChunkNum chunks.

For example, the lengths of ChunkNum chunks can be calculated as follows: the length of the k-th chunk is size 1, and the length of each of the remaining ChunkNum-1 chunks is size 2. Where size 2 can be determined based on the slice width and the bit per pixel, and size 1 can be determined based on the total resources, the number of chunks, and size 2. For example, $$size\ 2 = (((slice\_width * bpp) << 3) >> 3),$$

and $$size\ 1 = total\_resource - ((ChunkNum - 1) * size\ 2).$$

Compared with embodiment 20, the calculation formula for size 2 in embodiment 21 is different. In other words, since each byte is 8 bits, there is a "+7" operation in embodiment 20, which increases the length of the chunk by one byte; and in Example 21, there is no "+7" operation, which means the length of the chunk is one byte shorter.

The fifth step is, for SliceNumX slices within a slice line, to encode for ChunkNum times in sequence, each time interleaving a chunk of each of SliceNumX slices to form a code stream.

For example, before encoding the k-th chunk, chunk header information (can be referred to as chunk length indicating information) can also be encoded in the code stream, where the chunk header information indicates the length of the k-th chunk, the value of size 1. The chunk header information can be encoded by a fixed number of bits, such as a fixed 16 bits.

In an embodiment, when chunks corresponding to all slices within a slice line have been obtained, interleaving of chunks corresponding to all SliceNumX slices is started to obtain the code stream; where the chunks corresponding to all slices within a slice line have been obtained, including: for each slice, S chunks corresponding to the slice have been obtained, where S is greater than or equal to 1 and S is less than the number of chunks.

The sixth step is to determine whether all slice lines have been encoded; and if not, return to the third step to encode the next slice line.

In embodiment 21, for the decoding end, the following steps can be taken to implement the decoding method.

The first step is to divide the image horizontally and vertically into SliceNumX*SliceNumY rectangular slices.

The second step is to calculate the total resources (total_resource) (i.e., the target transmission bits number) and determine the number (ChunkNum) of chunks based on the slice height (slice_height) of a slice.

For example, the total resources can be calculated using the following formula:

$$total\_resource = ((slice\_width * slice\_height * target\_bpp + 7) >> 3) << 3;$$

or $$total\_resource = ((slice\_width * slice\_height * target\_bpp + 7 +$$
$$RC\_BUFFER\_LENGTH) >> 3) << 3.$$

Based on the slice height (slice_height), the number ChunkNum of chunks can be calculated using the following formula:

$$ChunkNum = slice\_height + 1.$$

The third step is to receive the code stream, and for SliceNumX slices in each slice line, to sequentially parse for ChunkNum times, each time parsing SliceNumX chunks and deinterleaving the SliceNumX chunks into their respective bitstream buffers of the SliceNumX slices.

For example, before parsing the k-th chunk from the code stream, the chunk header information of the chunk can be parsed first, where the chunk header information indicates the length of the k-th chunk. The chunk header information can be parsed using a fixed number of bits, such as 16 bits. Based on the value indicated by the chunk header information, the k-th chunk is parsed from the code stream.

For example, for each slice, it is parsed for ChunkNum times to obtain ChunkNum chunks. The lengths of ChunkNum chunks can be calculated as follows: the length of the k-th chunk is size 1, and the length of each of the remaining (ChunkNum-1) chunks is size 2. Size 2=(((slice_width*bpp) <<3)>>3), and size 1 is the value indicated by the chunk header information of the k-th chunk.

The fourth step is to decode each slice based on the bitstream buffer of each slice.

In an embodiment, when chunks exist in the bitstream buffers corresponding to the SliceNumX slices, decoding of the chunks corresponding to the SliceNumX slices starts. Where the chunks existing in the bitstream buffer corresponding to the SliceNumX slices can include but is not limited to: for each of the slices, T chunks of the slice exist in the bitstream buffer corresponding to the slice, where T is greater than or equal to 1, and T is less than the number of the chunks.

The fifth step is, after each slice is decoded, to obtain the reconstructed image of each slice.

The sixth step is to determine whether the parsing of code streams of all slice lines is completed. If not, it is returned to the third step to parse the next slice line. If so, the decoding process of the current image is completed and the next image can be parsed.

The above embodiments can be implemented separately or in combination. For example, each of embodiments 1-21 can be implemented separately, and at least two of embodiments 1-21 can be implemented in combination. The explanations of the parameters in the above embodiments can also be applied to other embodiments. For example, the explanation in embodiment 1 can be applied to embodiments 2-21, and the explanation in embodiment 3 can be applied to embodiments 4-21.

In the above embodiments, the content of the encoding end can also be applied to the decoding end, and the content of the decoding end can also be applied to the encoding end.

Embodiment 22

Based on the same concept as the above method, the embodiments of the present disclosure further propose a decoding device applied to the decoding end, including: one or more memories configured to store video data; and a decoder configured to implement the decoding methods in embodiments 1-21 above.

For example, in an embodiment, a decoder is configured to: divide a to-be-processed image into X*Y slices, where X represents a number of slices in a horizontal direction of the to-be-processed image, Y represents a number of slices in a vertical direction of the to-be-processed image, X is a positive integer greater than 1, and Y is a positive integer greater than or equal to 1; determine a number Z of chunks within each of the X*Y slices, where Z represents a number of the chunks included within each of the X*Y slices; for each of Y slice lines corresponding to the to-be-processed image, deinterleave chunks corresponding to X slices in the horizontal direction of the slice line in a target code stream, to obtain Z chunks for each of the X slices, where the Z chunks include at least two sizes of chunks; and decode, based on bitstream buffers corresponding to the X slices in the horizontal direction of the slice line, the X slices, where for each of the X slices, a bitstream buffer corresponding to the X slice includes the chunks corresponding to the slice.

Based on the same concept as the above method, the embodiments of the present disclosure further propose an encoding device applied to the encoding end, including: one or more memories configured to store video data; and an encoder configured to implement the encoding methods in embodiments 1-21 above.

For example, in an embodiment, an encoder is configured to: divide a to-be-processed image into X*Y slices, where X represents a number of slices in a horizontal direction of the to-be-processed image, Y represents a number of slices in a vertical direction of the to-be-processed image, X is a positive integer greater than 1, and Y is a positive integer greater than or equal to 1; determine a number Z of chunks within each of the X*Y slices, where Z represents a number of the chunks included within each of the X*Y slices; for each of Y slice lines corresponding to the to-be-processed image, encode X slices in the horizontal direction of the slice line to obtain X bitstream buffers corresponding to the X slices; for each of the X bitstream buffers, divide the bitstream buffer into Z chunks, where the Z chunks include at least two sizes of chunks; interleave chunks corresponding to the X slices in the horizontal direction of the slice line to obtain a target code stream; and transmit the target code stream to a decoding end.

Based on the same concept as the above method, the hardware architecture diagram of the decoding device (also known as a video decoder) provided in the embodiments of the present disclosure can be specifically shown in FIG. 9A, including a processor 911 and a machine-readable storage medium 912. Where the machine-readable storage medium 912 stores a machine executable instruction that can be executed by the processor 911; and the processor 911 is configured to execute the machine executable instruction to implement the decoding method according to any one of embodiments 1-21 of the present disclosure.

Based on the same concept as the above method, the hardware architecture diagram of the encoding device (also known as a video encoder) provided in the embodiments of the present disclosure can be specifically shown in FIG. 9B, including a processor 921 and a machine-readable storage medium 922. Where the machine-readable storage medium 922 stores a machine executable instruction that can be executed by the processor 921; and the processor 921 is configured to execute the machine executable instruction to implement the encoding method according to any one of embodiments 1-21 of the present disclosure.

Based on the same concept as the above method, the embodiments of the present disclosure further provide a machine-readable storage medium on which several computer instructions are stored. When the computer instructions are executed by a processor, the method according to any one of the above embodiments of the present disclosure can be implemented, such as the decoding methods or encoding methods in the above embodiments.

Based on the same concept as the above method, the embodiments of the present disclosure further provide a computer application program that, when executed by a processor, can implement the decoding method or encoding method according to any one of the embodiments of the present disclosure.

Based on the same concept as the above method, the embodiments of the present disclosure further propose a decoding apparatus applied to a decoding end, including: a dividing module, configured to divide a to-be-processed image into X*Y slices, where X represents a number of slices in a horizontal direction of the to-be-processed image, Y represents a number of slices in a vertical direction of the to-be-processed image, X is a positive integer greater than 1, and Y is a positive integer greater than or equal to 1; a determining module, configured to determine a number Z of chunks within each of the X*Y slices, where Z represents a number of the chunks included within each of the X*Y slices; a decoding module, configured to, for each of Y slice lines corresponding to the to-be-processed image, deinterleave chunks corresponding to X slices in the horizontal direction of the slice line in a target code stream, to obtain Z chunks for each of the X slices; where the Z chunks include at least two sizes of chunks; and decode, based on bitstream buffers corresponding to the X slices in the horizontal direction of the slice line, the X slices; where for each of the X slices, a bitstream buffer corresponding to the slice includes the chunks corresponding to the slice.

For example, the determining module is specifically configured to: determine, based on a slice width, a slice height, and a target bit per pixel, a target transmission bits number, and determining, based on the target transmission bits number and a configured chunk size value, the number of chunks; or determine, based on a slice height, the number of chunks.

For example, the decoding module is specifically configured to: sequentially parse, based on an order of the X slices in the horizontal direction in the slice line, one chunk corresponding to each of the X slices into a bitstream buffer corresponding to the slice, and determine whether all the Z chunks of each of the X slices have been parsed; in response to determining that all the Z chunks of each of the X slices have been parsed, complete the deinterleaving for the X slices and obtain all the Z chunks of each of the X slices; and in response to determining that parsing all the Z chunks of each of the X slices has not finished, return to an operation of sequentially parsing, based on an order of the X slices in the horizontal direction in the slice line, one chunk corresponding to each of the X slices into a bitstream buffer corresponding to the slice.

For example, the decoding module is specifically configured to: when chunks exist in the bitstream buffers corresponding to the X slices, start to decode the chunks corresponding to the X slices, The chunks existing in the bitstream buffer corresponding to the X slices includes: for each of the X slices, T chunks of the slice exist in the bitstream buffer corresponding to the slice, where T is greater than or equal to 1 and T is less than Z.

Based on the same concept as the above method, the embodiments of the present disclosure further propose an encoding device applied to an encoding end, including: a dividing module, configured to divide a to-be-processed image into X*Y slices, where X represents a number of slices in a horizontal direction of the to-be-processed image, Y represents a number of slices in a vertical direction of the to-be-processed image, X is a positive integer greater than 1, and Y is a positive integer greater than or equal to 1; a determining module, configured to determine a number Z of chunks within each of the X*Y slices, where Z represents a number of the chunks included within each of the X*Y slices; an encoding module, configured to, for each of Y slice lines corresponding to the to-be-processed image, encode X slices in the horizontal direction of the slice line to obtain X bitstream buffers corresponding to the X slices; for each of the X bitstream buffers, divide the bitstream buffer into Z chunks, where the Z chunks include at least two sizes of chunks; interleave chunks corresponding to the X slices in the horizontal direction of the slice line to obtain a target code stream; and a transmitting module, configured to transmit the target code stream to a decoding end.

For example, the determining module is specifically configured to: determine, based on a slice width, a slice height, and a target bit per pixel, a target transmission bits number, and determining, based on the target transmission bits number and a configured chunk size value, the number of chunks; or determine, based on a slice height, the number of chunks.

For example, the encoding module is specifically configured to: sequentially add, based on an order of the X slices in the horizontal direction of the slice line, one chunk corresponding to each of the X slices to a current code stream, and determine whether all Z chunks of each of the X slices have been added to the current code stream; in response to determining that all Z chunks of each of the X slices have been added to the current code stream, stop adding chunks and determining the current code stream as the target code stream; and in response to determining that any one chunk of all Z chunks of each of the X slices has not been added to the current code stream, return to execute an operation of sequentially adding, based on the order of the X slices in the horizontal direction of the slice line, one chunk corresponding to each of the X slices to a current code stream.

For example, the encoding module is specifically configured to: when chunks corresponding to the X slices have been obtained, start to interleave the chunks corresponding to the X slices, to obtain the target code stream. Where the chunks corresponding to the X slices have been obtained, including: for each slice, S chunks corresponding to the slice have been obtained, where S is greater than or equal to 1 and S is less than the number of chunks.

Based on the same concept as the above method, the embodiments of the present disclosure further provide a camera device, which may include the encoding end and/or the decoding end in any one of the above embodiments.

According to the same concept as the above method, the embodiments of the present disclosure further provide a machine readable storage medium, on which a number of computer instructions are stored. When the computer instructions are executed by the processor, the encoding and decoding method according to any one of the above embodiments of the present disclosure can be implemented. For example, the machine readable storage medium can be any electronic, magnetic, optical, or other physical storage device that can contain or store information such as executable instructions, data, and so on. For example, the machine readable storage medium may be a Radom Access Memory (RAM), a volatile memory, a non-volatile memory, a flash memory, a storage drive (e.g. hard disk drive), a solid state harddisk, any type of storage disk (e.g., compact disk, Digital Video Disk (DVD)), or a similar storage medium, or a combination thereof.

The systems, apparatuses, modules, or units elucidated in the above embodiments can be implemented specifically by a computer chip or entity, or by a product with certain functions. A typical implementation is a computer, which can take the form of a personal computer, laptop, cellular phone, camera phone, smart phone, personal digital assistant, media player, navigation device, email sending and receiving device, tablet computer, wearable device, or any combination of these devices.

For the convenience of description, the above devices are divided into various units according to their functions and described respectively. It is, of course, possible to implement the functions of each unit in the same or multiple software and/or hardware when implementing the present disclosure.

Those skilled in the art should understand that embodiments of the present disclosure can be provided as methods, systems, or computer program products. Accordingly, the present disclosure may take the form of an entirely hardware embodiment, an entirely software embodiment, or an embodiment combining software and hardware aspects. Furthermore, the embodiments of the present disclosure may employ the form of a computer program product implemented on one or more computer-usable storage media (including, but not limited to, disk storage, CD-ROM, optical storage, etc.), where the one or more computer-usable storage media having computer-usable program code.

The present disclosure is described with reference to the flowchart and/or block diagram of the method, device (system), and computer program product according to the embodiments of the present disclosure. It is to be understood that each process and/or block in the flowchart and/or block diagram, and the combination of processes and/or blocks in the flowchart and/or block diagram, may be implemented by computer program instructions. These computer program instructions may be provided to a processor of a general-purpose computer, a specialized computer, an embedded processor, or other programmable data processing device to produce a machine such that instructions executed by the processor of the computer or other programmable data processing device produce an apparatus for implementing a function specified in one or more processes of the flowchart and/or one or more blocks of the block diagram. These computer program instructions may also be stored in a computer-readable memory capable of directing the computer or other programmable data processing device to operate in a particular manner such that the instructions stored in the computer-readable memory produce an article of manufacture including an instruction apparatus that implements the function specified in one or more processes of the flowchart and/or one or more blocks of the block diagram.

These computer program instructions may be provided to a processor of a general-purpose computer, a specialized computer, an embedded processor, or other programmable device to produce a machine such that instructions executed by the processor of the computer or other programmable device produce an apparatus for implementing a function specified in one or more processes of the flowchart and/or one or more blocks of the block diagram. The above description is only embodiments of the present disclosure and is not intended to limit the present disclosure. For those skilled in the art, various modifications and changes may be made in the present disclosure. Any modification, equivalent replacement, improvement, etc. present the spirit and principle of the present disclosure shall be included in the scope of the claims of the present disclosure.

The invention claimed is:

1. A decoding method, comprising:

dividing a to-be-processed image into X*Y slices, wherein X represents a number of slices in a horizontal direction of the to-be-processed image, Y represents a number of slices in a vertical direction of the to-be-processed image, X is a positive integer greater than 1, and Y is a positive integer greater than or equal to 1;

determining a number Z of chunks within each of the X*Y slices, wherein Z represents a number of the chunks comprised within each of the X*Y slices; and for each of Y slice lines corresponding to the to-be-processed image, deinterleaving chunks corresponding to X slices in the horizontal direction of the slice line in a target code stream, to obtain Z chunks for each of the X slices, wherein the Z chunks comprise at least two sizes of chunks; and decoding, based on bitstream buffers corresponding to the X slices in the horizontal direction of the slice line, the X slices, and wherein for each of the X slices, a bitstream buffer corresponding to the slice comprises the chunks corresponding to the slice, and wherein X is calculated by: (image_width+slice_width−1)/slice_width, and Y is calculated by: (image_height+slice_height−1)/slice_height, wherein the image width represents an image width of the to-be-processed image, a value of the image width is not 0 and is an integer multiple of 16, the slice width represents a width of a slice, the image height represents an image height of the to-be-processed image, a value of the image height is not 0 and is an integer multiple of 2, and the slice height represents a height of a slice.

2. The method according to claim 1, wherein determining the number Z of chunks within each of the X*Y slices comprises:

determining, based on a slice width, a slice height, and a target bit per pixel, a target transmission bits number, and determining, based on the target transmission bits number and a configured chunk size value, the number of chunks.

3. The method according to claim 1, wherein deinterleaving the chunks corresponding to the X slices in the horizontal direction of the slice line in the target code stream, to obtain the Z chunks for each of the X slices comprises:

sequentially parsing, based on an order of the X slices in the horizontal direction in the slice line, one chunk corresponding to each of the X slices into a bitstream buffer corresponding to the slice, and determining whether all the Z chunks of each of the X slices have been parsed;

in response to determining that all the Z chunks of each of the X slices have been parsed, completing the deinterleaving for the X slices and obtaining all the Z chunks of each of the X slices; and in response to determining that parsing all the Z chunks of each of the X slices has not finished, returning to an operation of sequentially parsing, based on an order of the X slices in the horizontal direction in the slice line, one chunk corresponding to each of the X slices into a bitstream buffer corresponding to the slice.

4. The method according to claim 1, wherein decoding, based on the bitstream buffers corresponding to the X slices in the horizontal direction of the slice line, the X slices comprises:

when for each of the X slices, T chunks of the slice exist in the bitstream buffer corresponding to the slice, wherein T is greater than or equal to 1 and T is less than Z, starting to decode the chunks corresponding to the X slices.

5. The method according to claim 1, wherein for the Z chunks, a length of each of one or more remaining chunks except a k-th chunk is a first size, and a length of the k-th chunk is a second size, wherein the first size is determined based on a configured chunk size value, and wherein the second size is determined based on a target transmission bits number, the chunk size value, and the number of chunks.

6. The method according to claim 5, wherein the k-th chunk comprises a last chunk in the Z chunks.

7. An encoding method, comprising:

dividing a to-be-processed image into X*Y slices, wherein X represents a number of slices in a horizontal direction of the to-be-processed image, Y represents a number of slices in a vertical direction of the to-be-processed image, X is a positive integer greater than 1, and Y is a positive integer greater than or equal to 1;

determining a number Z of chunks within each of the X*Y slices, wherein Z represents a number of the chunks in each of the X*Y slices; and for each of Y slice lines corresponding to the to-be-processed image, encoding X slices in the horizontal direction of the slice line to obtain X bitstream buffers corresponding to the X slices;

for each of the X bitstream buffers, dividing the bitstream buffer into Z chunks, wherein the Z chunks comprise at least two sizes of chunks;

interleaving chunks corresponding to the X slices in the horizontal direction of the slice line to obtain a target code stream; and transmitting the target code stream to a decoding end, wherein X is calculated by: (image_width+slice_width−1)/slice_width, and Y is calculated by: (image_height+slice_height−1)/slice_height, wherein the image width represents an image width of the to-be-processed image, a value of the image width is not 0 and is an integer multiple of 16, the slice width represents a width of a slice, the image height represents an image height of the to-be-processed image, a value of the image height is not 0 and is an integer multiple of 2, and the slice height represents a height of a slice.

8. The method according to claim 7, wherein determining the number Z of chunks within each of the X*Y slices comprises:

determining, based on a slice width, a slice height, and a target bit per pixel, a target transmission bits number, and determining, based on the target transmission bits number and a configured chunk size value, the number of chunks.

9. The method according to claim 7, wherein interleaving the chunks corresponding to the X slices in the horizontal direction of the slice line to obtain the target code stream comprises:

sequentially adding, based on an order of the X slices in the horizontal direction of the slice line, one chunk corresponding to each of the X slices to a current code stream, and determining whether all Z chunks of each of the X slices have been added to the current code stream;

in response to determining that all Z chunks of each of the X slices have been added to the current code stream, stopping adding chunks and determining the current code stream as the target code stream; and in response to determining that any one chunk of all Z chunks of each of the X slices has not been added to the current code stream, returning to execute an operation of sequentially adding, based on the order of the X slices in the horizontal direction of the slice line, one chunk corresponding to each of the X slices to a current code stream.

10. The method according to claim 7, wherein interleaving the chunks corresponding to the X slices in the horizontal direction of the slice line to obtain the target code stream comprises:

when for each of the X slices, S chunks corresponding to the slice have been obtained, wherein S is greater than or equal to 1 and S is less than Z, starting to interleave the chunks corresponding to the X slices, to obtain the target code stream.

11. The method according to claim 7, wherein in a case that a length of a real encoded bits number is fixed, for the Z chunks, a length of each of one or more remaining chunks except a k-th chunk is a first size, and a length of the k-th chunk is a second size;

wherein the first size is determined based on a configured chunk size value, and the second size is determined based on a target transmission bits number, the chunk size value, and the number of chunks.

12. The method according to claim 11, wherein the k-th chunk comprises a last chunk in the Z chunks.

13. A decoding device, comprising:

one or more machine readable storage media, storing a machine executable instruction; and one or more processors, configured to execute the machine executable instruction to implement a decoding method, comprising:

dividing a to-be-processed image into X*Y slices, wherein X represents a number of slices in a horizontal direction of the to-be-processed image, Y represents a number of slices in a vertical direction of the to-be-processed image, X is a positive integer greater than 1, and Y is a positive integer greater than or equal to 1;

determining a number Z of chunks within each of the X*Y slices, wherein Z represents a number of the chunks comprised within each of the X*Y slices; and for each of Y slice lines corresponding to the to-be-processed image, deinterleaving chunks corresponding to X slices in the horizontal direction of the slice line in a target code stream, to obtain Z chunks for each of the X slices, wherein the Z chunks comprise at least two sizes of chunks; and decoding, based on bitstream buffers corresponding to the X slices in the horizontal direction of the slice line, the X slices, and wherein for each of the X slices, a bitstream buffer corresponding to the slice comprises the chunks corresponding to the slice, wherein X is calculated by: (image_width+slice_width−1)/slice_width, and Y is calculated by: (image_height+slice_height−1)/slice_height, wherein the image width represents an image width of the to-be-processed image, a value of the image width is not 0 and is an integer multiple of 16, the slice width represents a width of a slice, the image height represents an image height of the to-be-processed image, a value of the image height is not 0 and is an integer multiple of 2, and the slice height represents a height of a slice.

14. An encoding device, comprising:

one or more machine readable storage media, storing a machine executable instruction; and one or more processors configured to execute the machine executable instruction to implement the encoding method according to claim 7.

15. A non-transitory computer-readable storage medium storing instructions, wherein, when the instructions are executed by one or more processors, the decoding method according to claim 1 is implemented.

16. A non-transitory computer-readable storage medium storing instructions, wherein, when the instructions are executed by one or more processors, the encoding method according to claim 7 is implemented.

* * * * *